US009081591B2

(12) United States Patent
Kinoshita et al.

(10) Patent No.: US 9,081,591 B2
(45) Date of Patent: Jul. 14, 2015

(54) USER INTERFACE GENERATION APPARATUS

(75) Inventors: Kenta Kinoshita, Yokohama (JP);
Kazuhiro Yamamoto, Yokohama (JP)

(73) Assignee: KYOCERA CORPORATION, Kyoto-Shi, Kyoto (JE)

( * ) Notice: Subject to any disclaimer, the term of this patent is extended or adjusted under 35 U.S.C. 154(b) by 453 days.

(21) Appl. No.: 13/000,707

(22) PCT Filed: Jun. 26, 2009

(86) PCT No.: PCT/JP2009/061771
§ 371 (c)(1),
(2), (4) Date: Dec. 22, 2010

(87) PCT Pub. No.: WO2009/157560
PCT Pub. Date: Dec. 30, 2009

(65) Prior Publication Data
US 2011/0107244 A1  May 5, 2011

(30) Foreign Application Priority Data
Jun. 27, 2008 (JP) .................................. 2008-168945

(51) Int. Cl.
*G06F 17/21* (2006.01)
*G06F 9/44* (2006.01)
(52) U.S. Cl.
CPC .................................. *G06F 9/4443* (2013.01)
(58) Field of Classification Search
CPC ....... G06F 3/044; G06F 3/041; G06F 3/0416; G06F 3/04842; G06F 3/016; G06F 3/0488; G06F 3/017; G06F 3/0412; G06F 3/0414; G06F 3/04883; G06F 3/04886; G06F 17/28; G06F 17/30247; G06F 17/30557; G05D 23/1917; G05D 23/19; G05D 23/1919; G05D 1/0027; G05D 1/0212

USPC .......................... 715/247, 713, 759, 788, 790
See application file for complete search history.

(56) References Cited

U.S. PATENT DOCUMENTS 6,829,615 B2 * 12/2004 Schirmer et al. ...................... 1/1
7,594,171 B2 *  9/2009 Menninga ..................... 715/245
(Continued)

FOREIGN PATENT DOCUMENTS

JP  06-083537 A  3/1994
JP  09-138731 A  5/1997
(Continued)

OTHER PUBLICATIONS

Office Action dated Feb. 28, 2013 in Korean Application No. 10-2010-7029123.
(Continued)

*Primary Examiner* — Amy Ng
*Assistant Examiner* — Di Xiao
(74) *Attorney, Agent, or Firm* — Workman Nydegger

(57) ABSTRACT

A user interface generation apparatus 1 has an application program execution unit 11, a user interface generation unit 13, a user interface display unit 24, and a memory unit 50 for storing information on characteristics of an apparatus itself as well as object definition information defining objects composing a user interface. The user interface generation unit 13 generates a compound user interface by selecting object definition information stored in the memory unit 50, setting a margin for when the selected object is arranged based on the object definition information and the information on characteristics of the apparatus itself, and arranging the object in a predetermined area of the display unit based on the margin.

8 Claims, 19 Drawing Sheets

(56) References Cited

U.S. PATENT DOCUMENTS

| | | |
|---|---|---|
| 8,065,629 B1 * 11/2011 | Ragan | 715/799 |
| 8,370,766 B2 * 2/2013 | Selig | 715/810 |
| 2006/0050142 A1 * 3/2006 | Scott et al. | 348/14.05 |
| 2006/0161863 A1 * 7/2006 | Gallo | 715/810 |
| 2009/0089689 A1 * 4/2009 | Clark et al. | 715/762 |

FOREIGN PATENT DOCUMENTS

| | | |
|---|---|---|
| JP | 2001-36652 A | 2/2001 |
| JP | 2003-271310 A | 9/2003 |
| KR | 1020050091992 | 9/2005 |
| KR | 10-2010-7029123 | 6/2012 |

OTHER PUBLICATIONS

Office Action dated Jun. 25, 2013 in Japanese Application No. 2010-518082.
JPO Office Action dated Mar. 12, 2013 in JP 2010-518082.
Office Action dated Sep. 30, 2013 in Korean Application No. 2010-7029123.

* cited by examiner

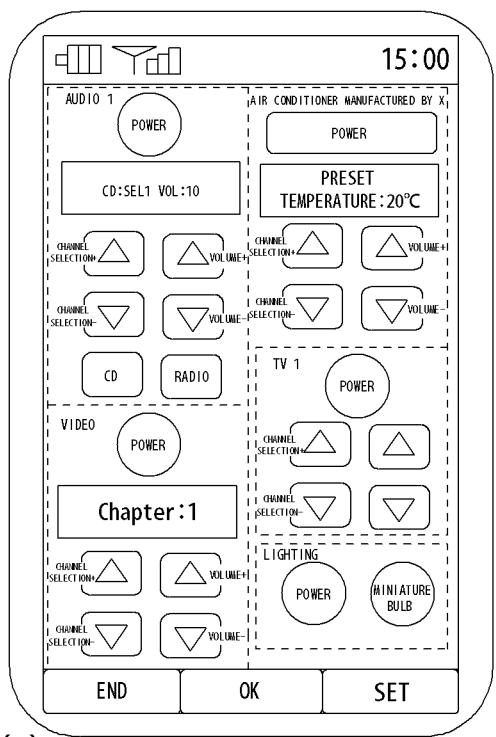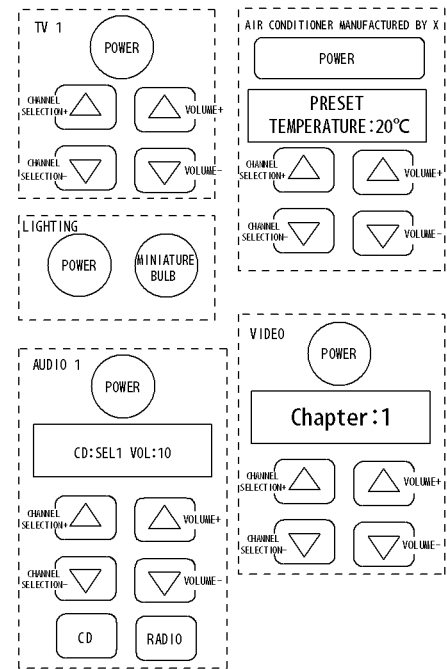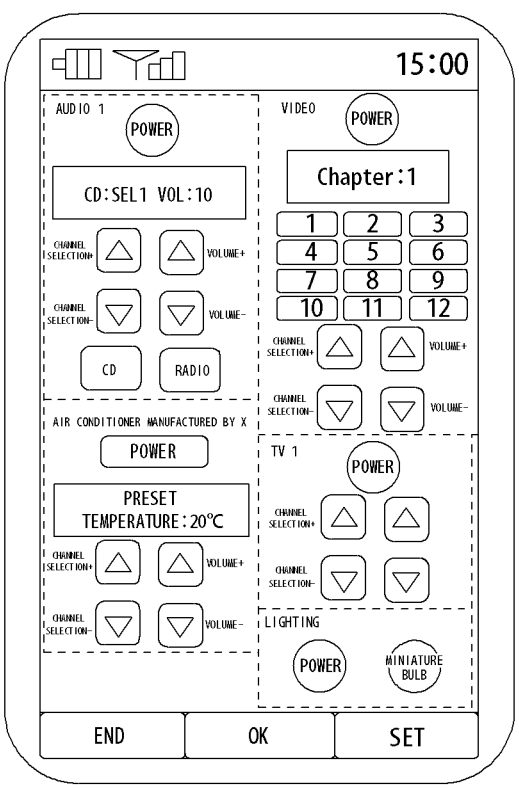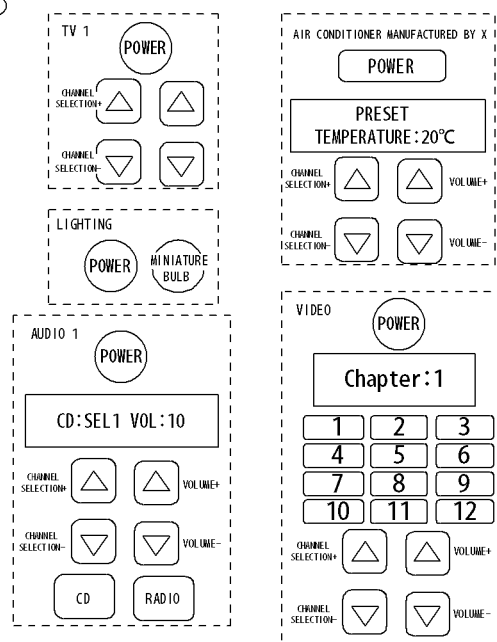
FIG. 6
(A) SIZE OF CONTACT AREA BY FINGER
(B) SIZE OF CONTACT AREA BY STYLUS

FIG. 9

| INPUT MEANS \ TYPE | Button | TextBox | Checkbox | Scrollbar |
|---|---|---|---|---|
| FINGER | POWER POWER | Chapter:1 0:02 | ☐ | ● (STANDARD SIZE) |
| STYLUS, MOUSE INPUT | POWER POWER | Chapter:1 0:02 | ☐ | ○ (STANDARD SIZE) |
| KEY INPUT | POWER POWER | Chapter:1 0:02 | ☐ | |

FIG. 11
(A)
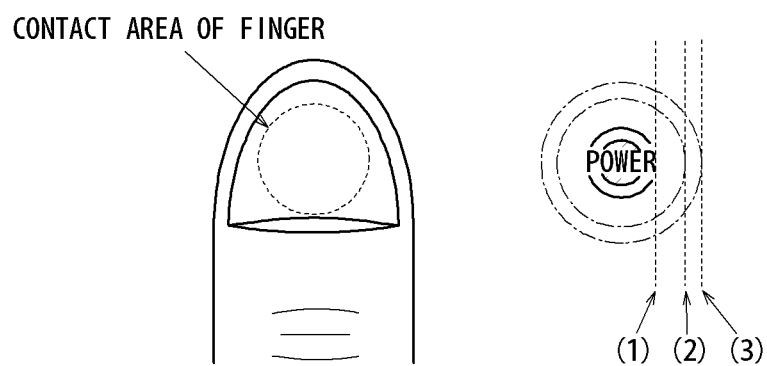
(B)
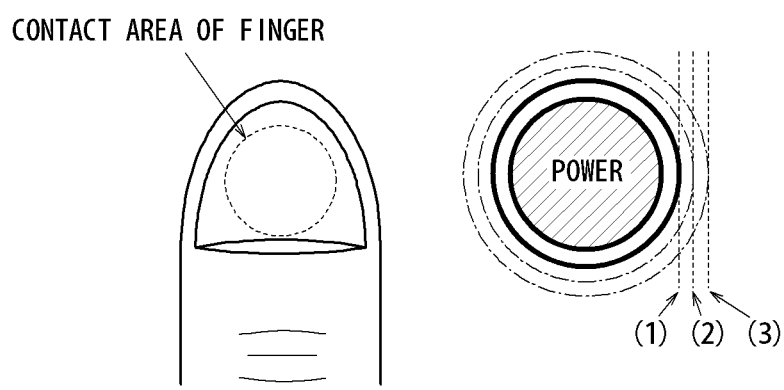

FIG. 12
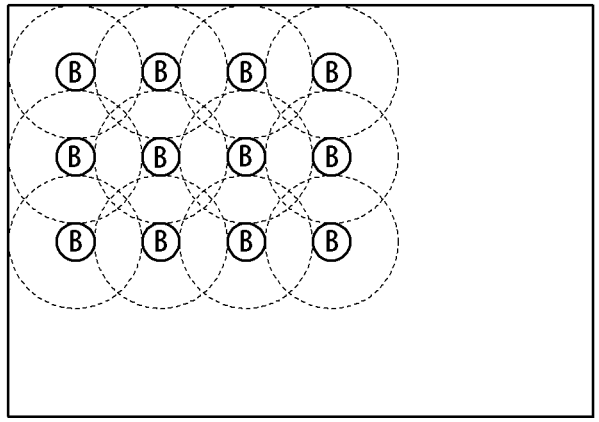
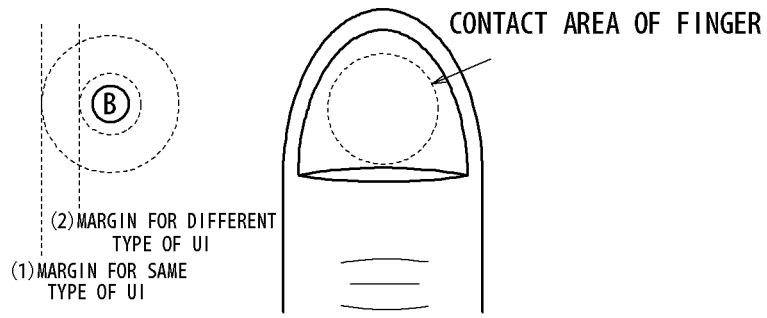
(2) MARGIN FOR DIFFERENT TYPE OF UI
(1) MARGIN FOR SAME TYPE OF UI
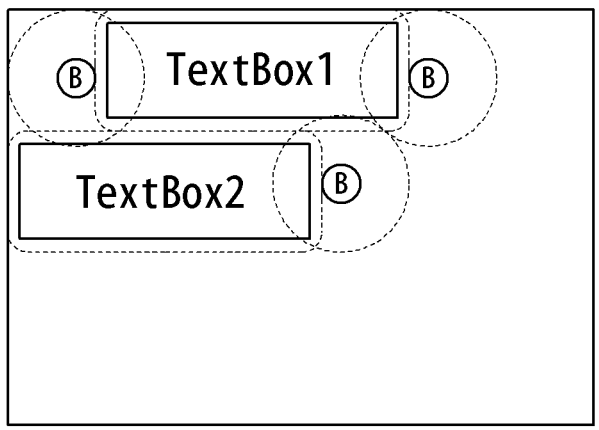
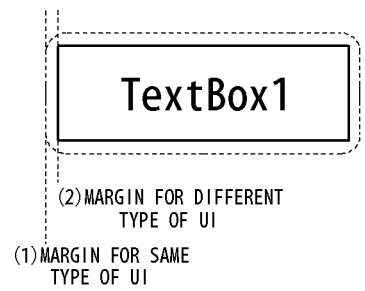
(2) MARGIN FOR DIFFERENT TYPE OF UI
(1) MARGIN FOR SAME TYPE OF UI

FIG. 13
(A)
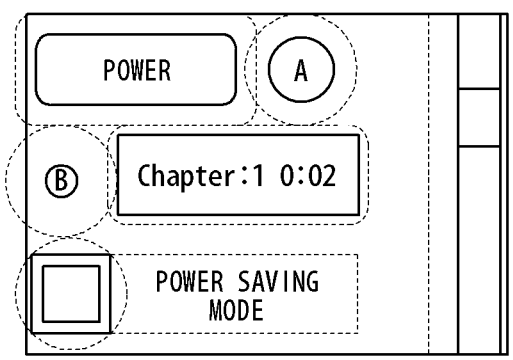
(B)
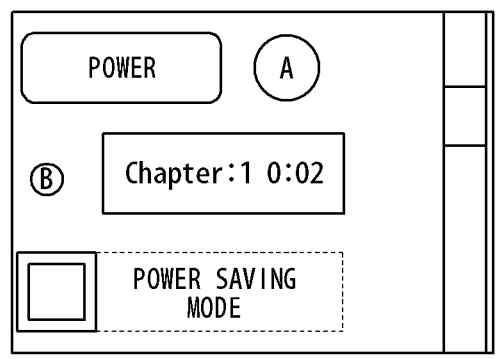

FIG. 14
(A)
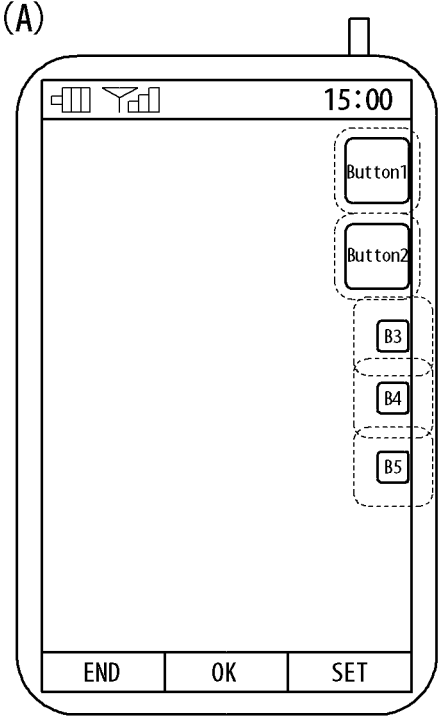
(B)
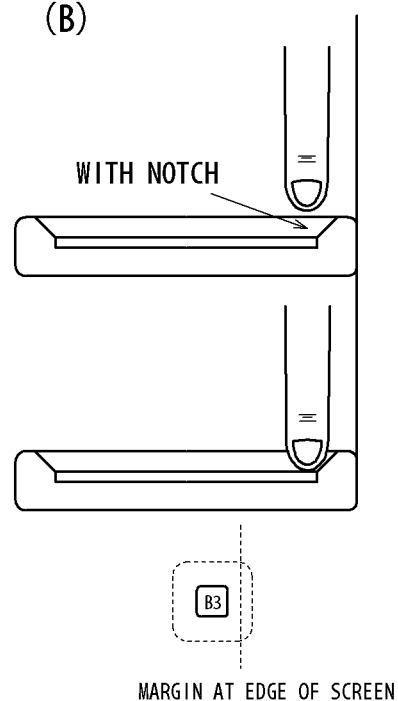
WITH NOTCH
MARGIN AT EDGE OF SCREEN
(C)
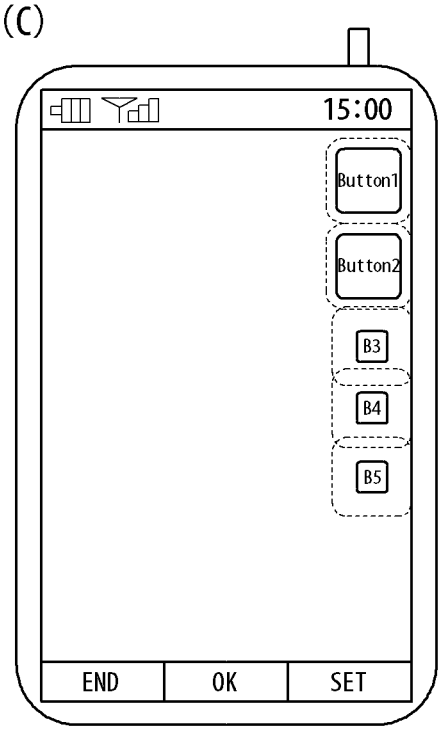
(D)
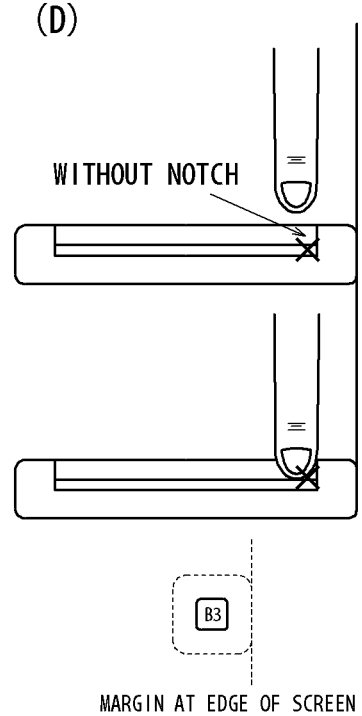
WITHOUT NOTCH
MARGIN AT EDGE OF SCREEN FIG. 15
(A) 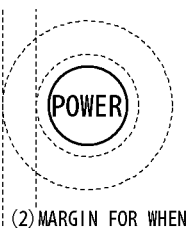
(2) MARGIN FOR WHEN BELONGS TO THE SAME UI
(1) MARGIN FOR WHEN BELONGS TO DIFFERENT UI
(B) 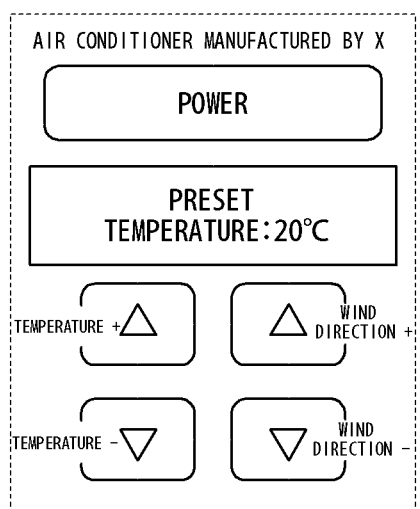
(C) 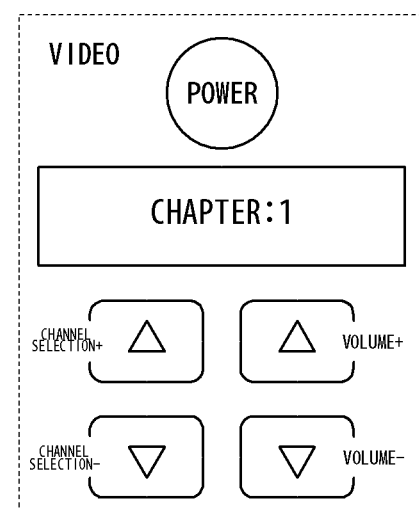
(D) 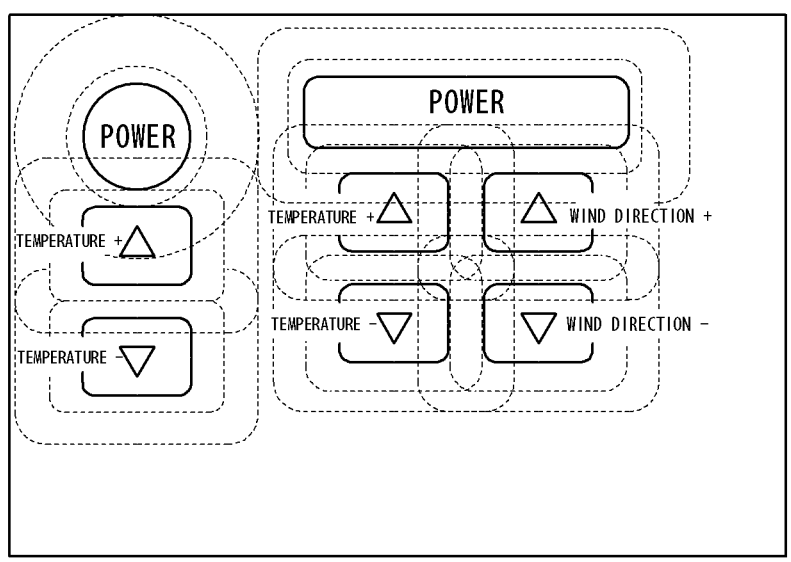

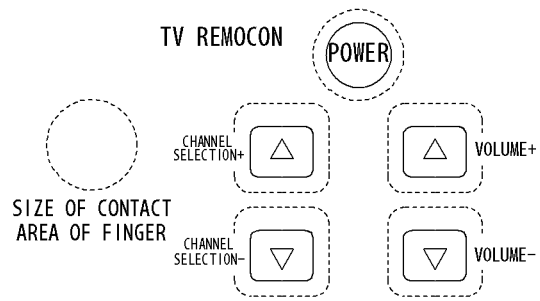

TV REMOCON

SIZE OF CONTACT AREA OF FINGER

POWER, CHANNEL SELECTION+, CHANNEL SELECTION−, VOLUME+, VOLUME−

(B)

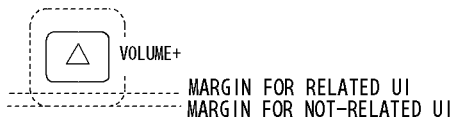

VOLUME+
MARGIN FOR RELATED UI
MARGIN FOR NOT-RELATED UI

Interface id = "TV1_interface"  particular_name = "TV1"

(1) ID = "switch ON"  priority = "0"  text = "POWER ON"

(2) ID = "select_up"  priority = "1"  text = "CHANNEL SELECTION+"  relate_ID = "select_1"

(3) ID = "select_down"  priority = "1"  text = "CHANNEL SELECTION−"  relate_ID = "select_1"

(4) ID = "volume_up"  priority = "1"  text = "VOLUME+"  relate_ID = "volume_1"

(5) ID = "volume_down"  priority = "1"  text = "VOLUME−"  relate_ID = "volume_1"

(C)

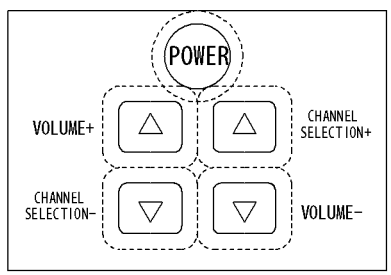

(D)

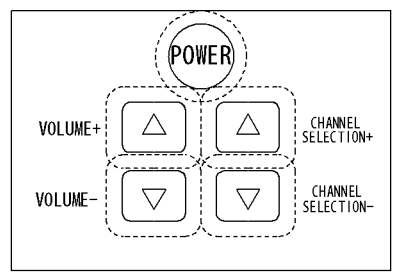

*FIG. 17*
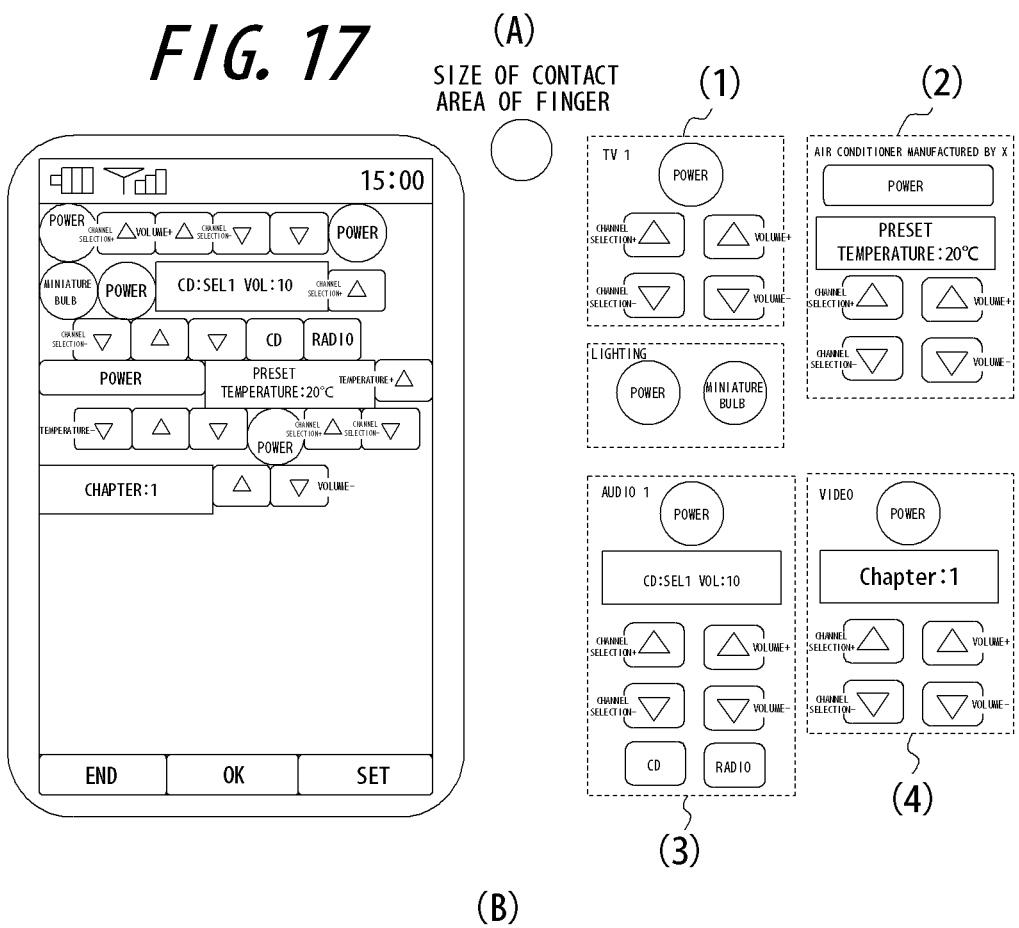
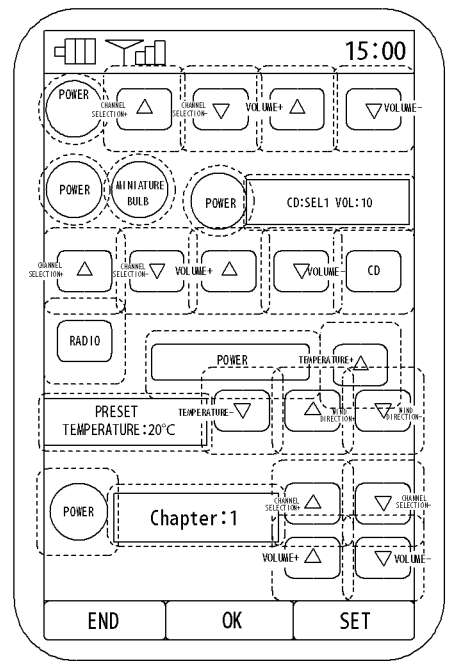

FIG. 18
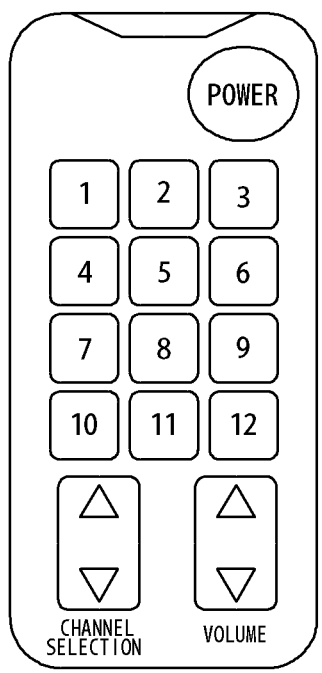
(A)
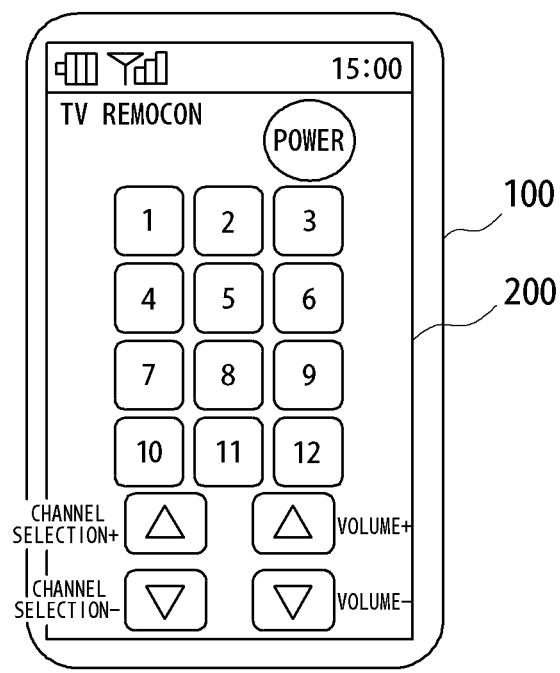
(B)
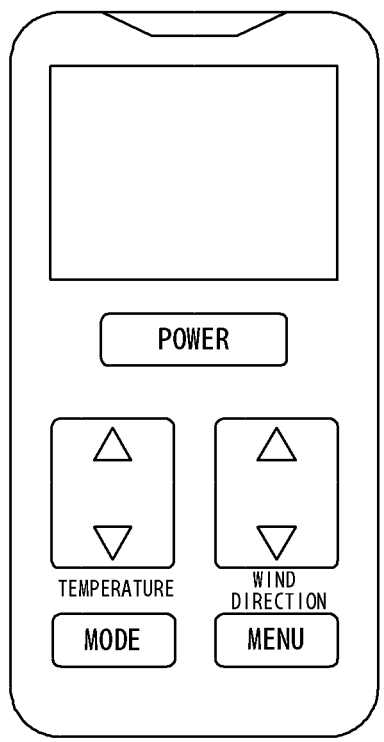
(C)
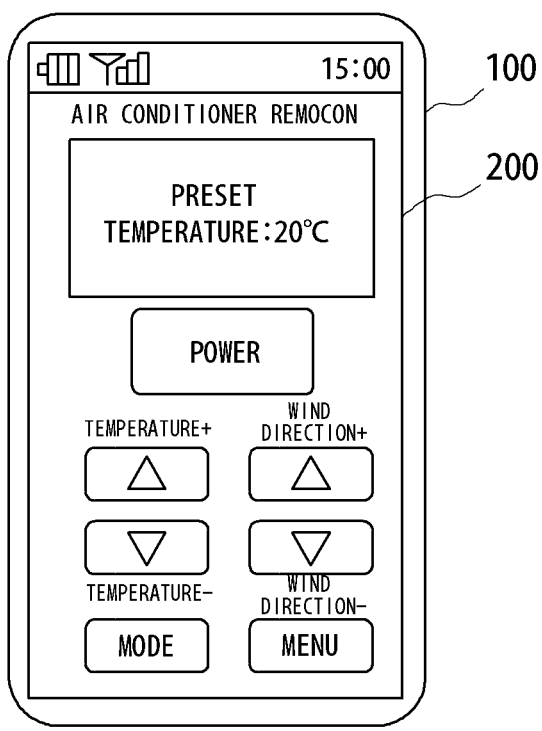
(D)

FIG. 19
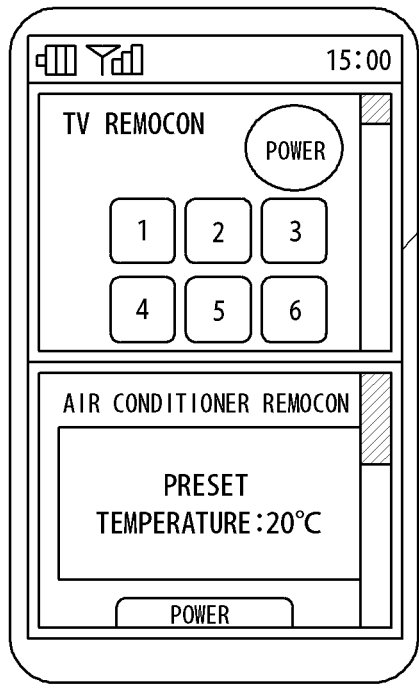
(A)
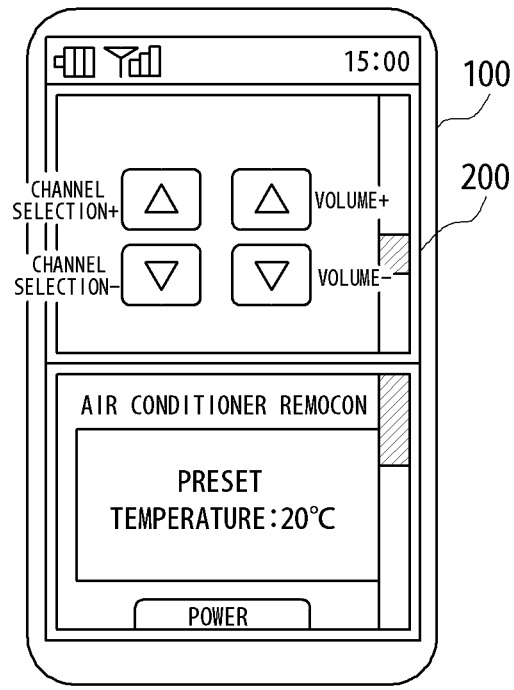
(B)
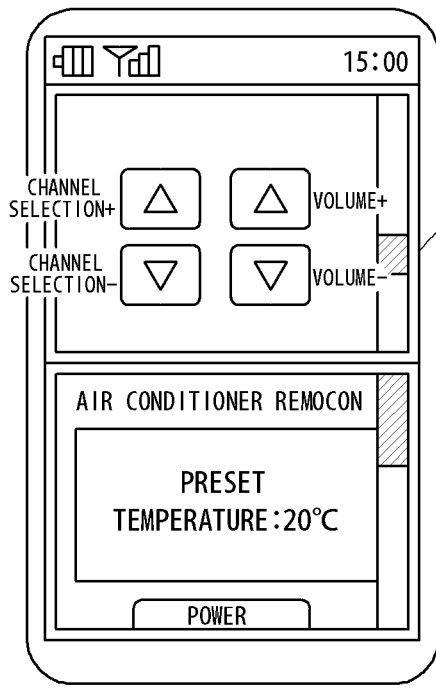
(C)
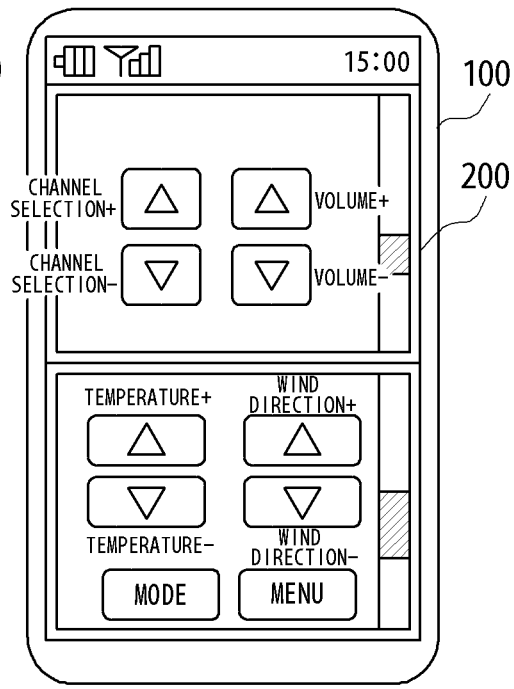
(D)

USER INTERFACE GENERATION APPARATUS

CROSS REFERENCE TO RELATED APPLICATION

This application claims priority to and the benefit of Japanese Patent Application No. 2008-168945 filed on Jun. 27, 2008, the entire contents of which are incorporated herein by reference.

TECHNICAL FIELD

The present invention relates to user interface generation apparatuses, and more particularly, to user interface generation apparatuses for generating user interface of mobile terminals.

BACKGROUND ART

The user interface (hereinafter, arbitrarily abbreviated to "UI") of the mobile terminal represented by a mobile phone has a great influence on operability when a user operates the mobile terminal. Accordingly, the UI of the mobile terminal is one of important factors for the user to purchase the mobile terminal.

With significant multi-functioning of the mobile terminal in recent years, there are numerous mobile terminals having picturesque UIs using animation and 3D. In addition, there are mobile terminals having UIs which can be customized as desired by users. Such mobile terminals dramatically improve convenience for the users.

Conventional mobile terminals generally have UI designs and operation methods which are different between manufacturers and models. That is, the UI is unique to each terminal and most of the conventional mobile terminals have UIs highly dependent on models. Therefore, when program codes of another terminal are reused in developing a terminal, it leads to voluminous change in parts of the UI to the program codes. Accordingly, it has been difficult to port program codes of a terminal to another terminal.

In order to deal with such a problem, UI based on XML (Extensible Markup Language) has been introduced. Expressing the UI by using an XML file whose description method is standardized facilitates reuse of the program codes and enables to port the UI to another model. Accordingly, it also enables to deal with UI solely independently from each terminal, such that the UI can be used by terminals of different models and different manufactures.

Representatives of such XML-based UI are UI Foundation developed by TAT (http://www.tat.se/), VIVID UI developed by Acrodea, Inc. (http://www.acrodea.co.jp/), UI One developed by Qualcomm Incorporated (http://www.qualcomm.co.jp/) and the like.

In addition, with multi-functioning and high-performance of a terminal body, an increasing number of recent mobile terminals mount OS (Operating System) which can perform a multi-task processing for simultaneously executing a plurality of tasks in parallel. Moreover, mobile terminals with multi-window function to multiplex output screen displays by allocating each of the plurality of tasks processed in parallel and simultaneously to an individual display area (window), have been becoming widely used.

Incidentally, Japanese Patent Laid-Open No. 2001-36652 discloses a scheme of remote operation (control) of a plurality of external equipments by infrared communication using a mobile phone terminal having an infrared communication unit. The mobile phone terminal described in Japanese Patent Laid-Open No. 2001-36652 is provided with an external control unit for communicating with the external equipments. This mobile phone terminal stores the external equipment control information for remotely controlling the external equipments, obtained via a telephone line or received from the external equipments, and remotely controls the external equipments based on the external equipment control information. That is, by changing an application program (hereinafter, referred to as "application" simply) included in the terminal, the terminal body, which is normally used as a mobile phone, can be used as a remote controller (hereinafter, referred to as "remocon" simply) for remotely controlling the plurality of external equipments.

SUMMARY OF INVENTION

Technical Problem

According to the mobile phone terminal disclosed in the above Japanese Patent Laid-Open No. 2001-36652, a single mobile phone terminal can remotely control the plurality of external equipments based on respective external equipment control information corresponding to the external equipments. Therefore, there is no need to do cumbersome operation for the user to separately use individual remocon terminals for the plurality of external equipments, which improves convenience for the user.

If such functions of the remocon to remotely switch between the plurality of external equipments to be controlled remotely is implemented in the mobile terminal capable of multi-task processing stated above, it is not necessary to exit a remocon application to initiate another remocon application. That is, it is possible to initiate a plurality of applications on a single terminal and to use a desired remocon application among them timely.

However, the operation to switch the plurality of applications frequently is cumbersome.

If the multi-windows function stated above is embedded in the mobile terminal, UIs for operating the plurality of applications can be displayed on the plurality of windows, respectively. Thereby, it is possible to use the applications on a single screen simultaneously without switching among the plurality of applications.

For a TV remocon terminal solely as shown in FIG. 18(A), for example, UI of TV remocon application may be reproduced on a touch panel 200 of a mobile terminal 100, for example, while maintaining operability of the TV remocon terminal, as shown in FIG. 18(B). Although keys such as numerical keys or buttons of the remocon terminal shown in FIG. 18(A) are mechanical keys, the numerical keys or the buttons are reproduced as objects and displayed on the touch panel 200 of the mobile terminal 100 shown in FIG. 18(B). Such keys or buttons and information display area composing the UI displayed on the touch panel in this manner are hereinafter called as "UI object". In addition, in a similar manner as the TV remocon terminal, for an air conditioner remocon solely as shown in FIG. 18(C), UI of air conditioner remocon application may be reproduced on the touch panel 200 of the mobile terminal 100, while maintaining operability of the air conditioner remocon terminal, as shown in FIG. 18(D). Moreover, if each UI of application is described in XML as the basis, almost the same UI can be easily reproduced in another terminal only by processing the XML file describing the UI, even if the application is ported to the another terminal of a different manufacturer.

However, in order to operate an air conditioner while viewing a TV in the above example, there may be a need for cumbersome operations for both of the TV and the air conditioner. In such a case, the applications for both the TV and the air conditioner may be displayed simultaneously by dividing a display area of the display unit by using the multi-task function and the multi-window function. However, simultaneous display of the UIs results in displays as shown in FIG. 19(A) to (D), as each application has only the UI which assumed to be used solely.

FIG. 19(A) to (D) are diagrams illustrating states when the UIs of two applications are simultaneously displayed by using the mobile terminal 100 having the multi-task function and the multi-window function. In the examples shown in the figures, only a part of each UI is displayed, as each of the UIs is reproduced as it stands in each of the windows vertically separating the display unit of the touch panel 200. A scroll bar is provided on the right in each window so as to enable operation of parts beyond the screen.

In order to adjust volume of the TV in a state shown as FIG. 19(A), for example, the user needs to move the scroll bar in the window of the TV remocon UI so as to move a displayed area of the TV remocon UI, as shown in FIG. 19(B). Similarly, in order to adjust temperature of the air conditioner in a state shown as FIG. 19(C), for example, the user needs to move the scroll bar in the window of the air conditioner remocon UI so as to move a displayed area of the air conditioner remocon UI, as shown in FIG. 19(D). Moreover, when a plurality of applications are activated by the multi-window function and the UIs are displayed overlapping each other, it is necessary to select the window to activate it before starting input operation.

If UI designed to fit into a screen so as to be used solely is displayed by using the multi-window function, all of the UI objects cannot be fit in the screen, thus it deteriorates operability of the UI.

In order to fit a plurality of UI objects in the screen, it may be considered to effectively utilize a limited display area of the UI, by reducing the plurality of UI objects to be arranged or by arranging the plurality of UI objects close to one another.

However, if the plurality of UI objects is arranged close to one another prioritizing effective utilization of the display area of the UI, it may deteriorate operability and visibility of the entire UI. For example, if numerous small UI objects are closely arranged in the UI display area of one screen, each of the UI objects are too close to others, which makes difficult for the user to operate an intended UI object with a finger and the like.

It is an object of the present invention in consideration of such conditions to provide a user interface generation apparatus, when generating a UI composed of a plurality of UI objects, capable of arranging each UI object in the display area of the UI while maintaining operability and visibility corresponding to characteristics of the UI object.

Solution to Problem

In order to achieve the above object, a user interface generation apparatus according to a first aspect includes:
an application program execution unit for implementing a variety of functions based on an application program;
a user interface generation unit for generating a user interface for instructing the application program execution unit to execute a predetermined function based on the application program;
a display unit for displaying the user interface generated by the user interface generation unit; and
a memory unit for storing user interface definition files, each of which includes user interface object definition information for defining a user interface object, which is a component of the user interface, and for storing apparatus-dependent information (terminal-dependent information) indicating characteristic of the user interface generation apparatus, wherein
the user interface generation unit generates a compound user interface by selecting user interface object definition information stored in the memory unit, setting a margin to be secured when arranging a user interface object corresponding to the user interface object definition information selected, based on the user interface object definition information selected and the terminal-dependent information, and arranging the user interface object selected based on the margin in a predetermined display area on the display unit.

A second aspect of the present invention is that, in the user interface generation apparatus according to the first aspect,
if the user interface object and another user interface object to be arranged adjacent to the user interface object are included in different user interface definition files, the user interface generation unit sets a larger margin between the user interface object and the another user interface object to be arranged adjacent thereto than a margin set therebetween in a case both of the user interface objects are included in the same user interface definition file.

A third aspect of the present invention is that, in the user interface generation apparatus according to the first aspect,
the apparatus-dependent information includes information on a standard size, which represents an area used as a standard when the user interface receives user operation, and
the user interface generation unit, if both of the user interface object and another user interface object to be arranged adjacent to the user interface object are of a type to receive the user operation, sets a margin between the user interface object and the another user interface object to be arranged adjacent thereto, based on a display size of the user interface object and the standard size.

A fourth aspect of the present invention is that, in the user interface generation apparatus according to the first aspect,
the apparatus-dependent information includes information on a standard size, which represents an area used as a standard when the user interface receives user operation, and
the user interface generation unit, if the user interface object is of a type to receive the user operation, sets a margin between the user interface object and an edge of the display unit, for when the user interface object is arranged at the edge of the display unit, based on a display size of the user interface object and the standard size.

A fifth aspect of the present invention is that, in the user interface generation apparatus according the first aspect,
the apparatus-dependent information includes information determined based on a shape of a member defining a periphery of the display unit, and
the user interface generation unit, if the user interface object is of the type to receive user operation, sets a margin for when the user interface object is arranged at an edge of the display unit, based on a display size of the user interface object and the apparatus-dependent information.

A sixth aspect of the present invention is that, in the user interface generation apparatus according to the first aspect,
the user interface object definition information includes information on relationship between the user interface object and another user interface object, and the user interface generation unit, if the user interface object and another user interface object to be arranged adjacent to the user interface object are highly related to each other according to the information on relationship, sets a smaller margin between the user interface object and the another user interface object to be arranged adjacent thereto than a margin between the user interface object and other user interface object having no information on relationship.

A seventh aspect of the present invention is the user interface generation apparatus according to the first aspect, further including an input operation means determination unit for determining an input operation means to the user interface, wherein the apparatus-dependent information includes information on standard sizes corresponding to a plurality of input operation means for input to the user interface, and the user interface generation unit, if the user interface object is of the type to receive user operation, sets a margin between the user interface object and another user interface object to be arranged adjacent to the user interface object, based on a display size of the user interface object and the information on the standard size, in accordance with the input operation means determined by the input operation means determination unit.

An eighth aspect of the present invention is the user interface generation apparatus according to the first aspect, further including input operation reception unit for receiving an input to instruct the application program execution unit to execute a predetermined function based on the application program via the user interface, and an input operation means determination unit for determining an input operation means to the input operation reception unit, wherein the user interface generation unit rewrites the apparatus-dependent information in accordance with the input operation means determined by the input operation means determination unit.

A ninth aspect of the present invention is that, in the user interface generation apparatus according to the eighth aspect, the user interface generation unit, if a change of the input operation means is detected by the input operation means determination unit while the compound user interface is displayed on the display unit, rewrites the apparatus-dependent information in accordance with a current input operation means and generates a new compound user interface based on current apparatus-dependent information.

BRIEF DESCRIPTION OF DRAWINGS

FIG. 6 is a diagram illustrating exemplary compound user interface by UI re-compound processing accompanying a change of an operation means according to the embodiment of the present invention;

FIG. 9 is a diagram illustrating examples to set different margins corresponding to a type of a user interface object and the input means;

FIG. 11 is a diagram illustrating examples to set different margins corresponding to a display size of the user interface object and a standard size;

FIG. 12 is a diagram illustrating exemplary setting of different margins corresponding to a type of an adjacent user interface object;

FIG. 13 is a diagram illustrating setting of margins when the user interface objects are arranged at the edge of the user interface display area;

FIG. 14 is a diagram illustrating setting of margins when the user interface objects are arranged at the edge of the user interface display area according to a form of a periphery of a member surrounding a touch panel;

FIG. 15 is a diagram illustrating exemplary setting of different margins according to the user interface to which the user interface object originally belongs;

FIG. 16 is a diagram illustrating examples of setting of different margins according to relationship between the user interface objects;

FIG. 17 is a diagram illustrating exemplary arrangement of the user interface object based on the margin setting processing;

FIG. 18 is a diagram illustrating conventional remote controllers reproduced by the user interface of a mobile terminal; and FIG. 19 shows diagrams illustrating examples of conventional compound of two user interfaces by the mobile terminal.

DESCRIPTION OF EMBODIMENTS

An embodiment of the present invention will be described with reference to the accompanying drawings. In the embodiment described below, a mobile phone having remote control functions for remotely controlling various external apparatuses is used as an example of a user interface (hereinafter, referred to as "UI") according to the present invention. However, the UI generation apparatus according to the present invention is not limited to the mobile phone but may be applicable to any portable terminals such as, for example, a laptop computer, PDA and the like. In addition, the UI generation apparatus according to the present invention is also applicable to an apparatus which needs to mount it, even if it is not a mobile terminal. It is to be noted that the present invention primarily intends to compound a plurality of UIs to be used simultaneously. Therefore, an application instructed by each UI is not limited to a remote control function but the present invention may be applicable to various kinds of applications.

Figure 1:
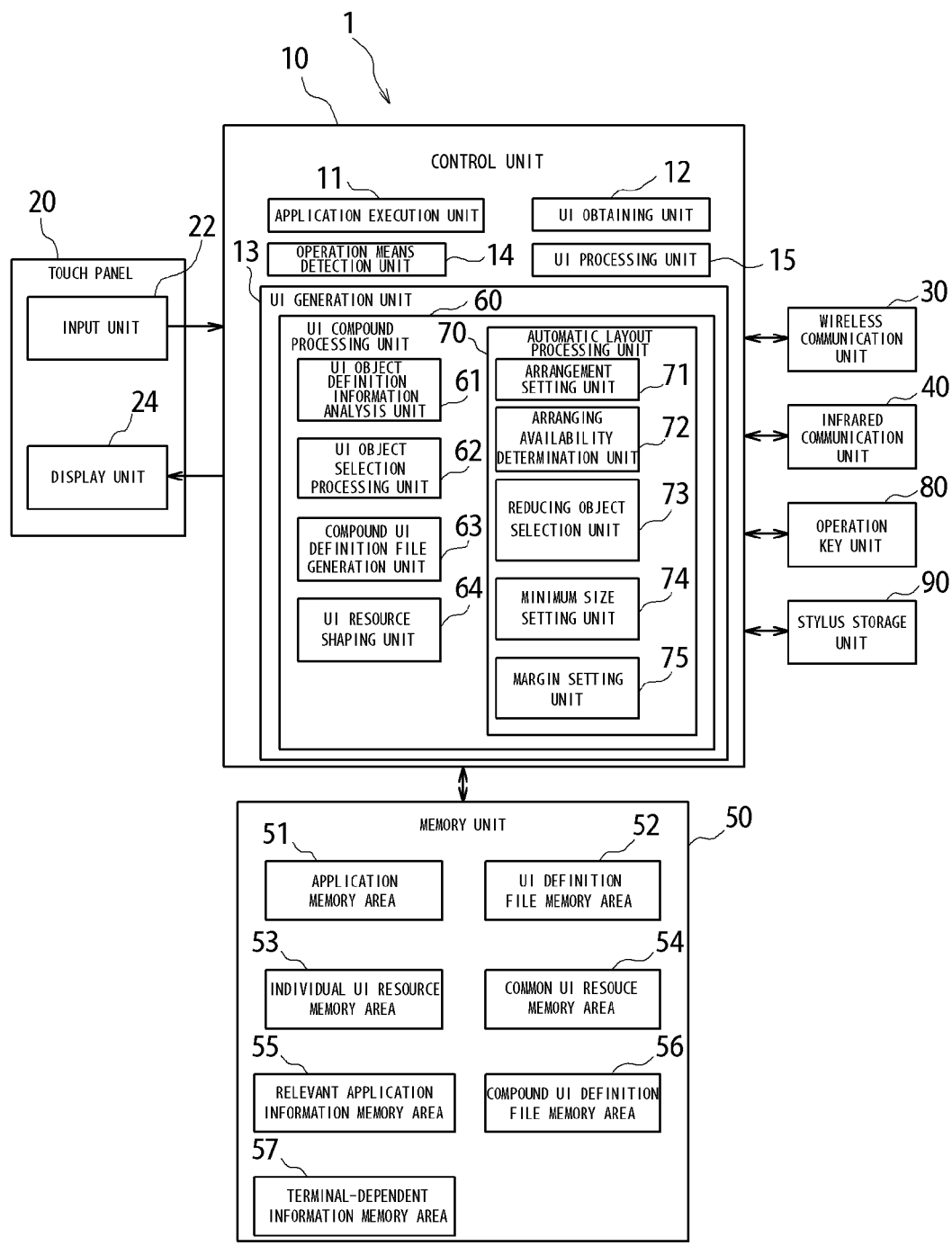
FIG. 1 is a block diagram illustrating a schematic configuration of a user interface generation apparatus according to the present invention.

FIG. 1 is a block diagram illustrating a schematic configuration of a mobile phone, which is a UI generation apparatus according to an embodiment of the present invention.

A mobile phone 1 includes a control unit 10 for controlling the overall operation and a touch panel 20 for receiving input by a user and for displaying a result of input and the like depending on each application. The touch panel 20 has an input unit 22 constituted of matrix switches and the like to receive input by the user and arranged on top of a display unit 24 constituted of a liquid crystal display and the like. The input unit 22 of the touch panel 20 detects contact by a user's finger or a pen-shaped input device such as a stylus and outputs a signal corresponding to input by such contact. The display unit 24 displays according to an application program and also displays an image of UI, composed of UI objects such as various types of keys or buttons for receiving input by the user, in a predetermined UI display area.

In addition, the mobile phone 1 includes a wireless communication unit 30 for transmitting and receiving various information such as voice call, data of e-mail and the like to/from a base station (not shown) via the internet, by radio and the like, and an infrared communication unit 40 for communicating with various external equipments (not shown) by using infrared rays. The mobile phone 1 transmits and receives a variety of data to/from the external equipments by using the wireless communication unit 30 via the internet, by radio and the like.

The mobile phone 1 is further provided with an operation key unit 80 and a stylus storage unit 90. The operation key unit 80 includes a plurality of keys constituted of mechanical switches disposed on a body of the mobile phone 1 or a direction indicator key or a direction indicator device for moving a pointer displayed on the display unit 24. The operation key unit 80 transmits the signal corresponding to input operation by the user to the control unit 10. Uses and functions of the variety of keys constituting the operation key unit 80 are defined in accordance with an application to be used. Accordingly, an operational input reception unit is constituted to include the input unit 22 of the touch panel 20 and the operation key unit 80 according to the present embodiment.

The stylus storage unit 90 stores the stylus, the pen-shaped input device for inputting to the input unit 22 of the touch panel 20. The stylus is stored in the stylus storage unit 90, and thereby the stylus is stored in the body of the mobile phone 1. The stylus storage unit 90 has a switch (not shown) to detect attach and detach of the stylus. That is, the switch is turned on and off by an operation to store the stylus in the stylus storage unit 90 and an operation to take the stylus out of the stylus storage unit 90, respectively. Accordingly, the control unit 10 can determine whether the stylus is stored in the stylus storage unit 90, that is, in the body of the mobile phone 1, by a signal from the stylus storage unit 90.

Furthermore, the mobile phone 1 is provided with a memory unit 50 for storing input information and various applications and also for functioning as a work memory. The memory unit 50 includes an application memory area 51, a UI definition file memory area 52, an individual UI resource memory area 53, a common UI resource memory area 54, a relevant application information memory area 55, a compound UI definition file memory area 56, and a terminal-dependent information memory area 57.

The control unit 10 includes an application execution unit 11, a UI obtaining unit 12, a UI generation unit 13, an operation means detection unit 14 and a UI processing unit 15.

The application execution unit 11 of the control unit 10 executes various applications stored in the application memory area 51 of the memory unit 50, as well as controlling such execution. In addition, the application execution unit 11, in response to input to a UI corresponding to the application being read out from the application memory area 51 and executed, executes functions of the application corresponding to the input.

The UI obtaining unit 12 obtains resource (image data and the like) and a UI definition file (XML file and the like) from outside the terminal via the wireless communication unit 30. The UI generation unit 13 performs a parsing process and a DOM (Document Object Model) process on the UI definition file, and generates a UI to be used actually. The UI generation unit 13 interprets UI information, described in an XML form, by using an XML engine and displays the UI generated based on the UI definition file on the display unit 24 of the touch panel 20.

The UI generation unit 13 performs various processing in relation to generation of various UIs including a compound UI. A detailed description of the UI generation unit 13 will be provided below.

The operation means detection unit 14 detects a means with which the user performs input operation. For example, if there is an input signal from the input unit 22 of the touch panel 20, the operation means detection unit 14 determines that the user inputs with the touch panel. Meanwhile, if there is an input signal from the operation key unit 80, the operation means detection unit 14 determines that the user inputs with the operation keys.

If input is detected from the input unit 22 of the touch panel 20 and an area on the input unit 22 from which input is detected is larger than a predetermined area, the operation means detection unit 14 determines that the user inputs with his/her finger. Meanwhile, if the area from which input is detected is smaller than the predetermined area and very small, the operation means detection unit 14 determines that the user inputs with a pointed input device, such as the stylus. In addition, if it is detected that the stylus is taken out of the stylus storage unit 90, the operation means detection unit 14 determines that input will be performed with the stylus thereafter. Moreover, when it is detected that the stylus is stored in the stylus storage unit 90, the operation means detection unit 14 determines that input will be performed without the stylus thereafter. That is, in this case, the operation means detection unit 14 expects input on the touch panel 20 with the finger or the operation key unit 80.

Furthermore, if the pointer for selecting an input spot is displayed on the display unit 24 in accordance with a predetermined operation, the operation means detection unit 14 expects input from the direction indicator key or the direction indicator device of the operation key unit 80 for moving the pointer.

The UI processing unit 15 processes an event, occurred based on input to the input unit 22 by the user, to the UI generated by the UI generation unit 13 and instructs the application execution unit 11 to execute various functions appropriately.

The UI generation unit 13 described above has a UI compound processing unit 60, for performing UI compound processing based on a plurality of UI definition files. The UI compound processing unit 60 includes a UI object definition information analysis unit 61, a UI object selection processing unit 62, a compound UI definition file generation unit 63, a UI resource shaping unit 64 and an automatic layout processing unit 70.

The UI object definition information analysis unit 61 analyzes the UI object definition information defining various UI objects included in the UI definition file.

The UI object selection processing unit 62 performs processing to select a necessary UI object from numerous UI objects, either automatically or with input by the user. When selection is performed by input of the user, the UI object selection processing unit 62 performs processing and control to generate a selection screen for receiving input to select a UI object by the user, by analyzing the UI object definition information defining the UI object to be displayed on the display unit 24. Hereinafter, the screen displaying information on the UI objects on the display unit 24 to receive selection input by the user is referred to as a "UI object selection screen" or simply "selection screen".

The UI object selection processing unit 62 includes an occupancy accumulation unit (not shown) for accumulating occupancies of selected UI objects in a predetermined UI display area, on the UI object selection screen. The occupancy accumulation unit accumulates occupancies of UI objects based on UI object attribute information included in the UI object definition information of each UI object and the terminal-dependent information (apparatus-dependent information) stored in the terminal-dependent information memory area 57.

The compound UI definition file generation unit 63 generates and outputs a compound UI definition file of the UI compounded by the UI compound processing unit 60.

The UI resource shaping unit 64 performs preview processing of selected UI objects and processing to expand or reduce data of resource used to compound UIs, based on a display size of each UI object. In this case, the UI resource shaping unit 64 reads out and uses the data of the resource stored in the individual UI resource memory area 53 or the common UI resource memory area 54.

The automatic layout processing unit 70 performs control and processing in association with layout in compounding the UIs. Therefore, the automatic layout processing unit 70 includes an arrangement setting unit 71, an arrangement availability determination unit 72, a reducing object selection unit 73, a minimum size setting unit 74 and a margin setting unit 75.

The arrangement setting unit 71 arranges UI objects in accordance with a predetermined procedure. The arrangement availability determination unit 72 determines whether the UI objects arranged by the arrangement setting unit 71 can be arranged in a predetermined UI display area. If the arrangement availability determination unit 72 determines that the UI objects cannot be arranged in the predetermined UI display area, the reducing object selection unit 73 selects a UI object to be reduced, following a predetermined procedure. The minimum size setting unit 74 sets a lower limit of reducing for each UI object in accordance with the terminal-dependent information and the UI object definition information. In arranging the UI objects, the margin setting unit 75 sets an adequate space around a UI object, such that the UI object is not arranged too close to another UI object or an edge of the UI display area. Such space provided around each UI object is hereinafter referred to as a "margin".

The application memory area 51 of the memory unit 50 stores a variety of applications constituted of data describing procedures to implement various functions. The UI definition file memory area 52 stores the UI definition file defining a sequence of generation rules to generate each UI overall. The individual UI resource memory area 53 stores individual UI resource such as image data and character string (text) data used to generate UI unique to each application. The common UI resource memory area 54 stores common UI resource such as image data and font data commonly used by the UIs that the terminal uses, except for the individual UI resource unique to each application. When the UI is actually generated, image data, text data and the like stored in the individual UI resource memory area 53 and the common UI resource memory area 54 are displayed on the display unit 24 of the touch panel 20.

In addition, the relevant application information memory area 55 stores relevant application information including activation information of an application relevant to the UI object and the like. The compound UI definition file memory area 56 stores the compound UI definition file generated by the compound UI definition file generation unit 63. The terminal-dependent information a 57 stores the terminal-dependent information (apparatus-dependent information) such as font information usable by the terminal itself, input device information, image size information, standard size information, information on a current input means, peripheral margin information stated below, which are information on unique characteristics of the terminal, depending on the terminal and the display unit 24.

Next, the UI definition file stored in the UI definition file memory area 52 according to the present embodiment is described.

The UI definition file memory area 52 of the memory unit 50 stores the UI definition file defining specifications and operations of a corresponding application of a UI necessary for execution of the application stored in the application memory area 51. Although the same UI may be used by different applications, here it is assumed that the UI used by each application differs from one another, for convenience of description, and that each UI definition file corresponding to each application is stored.

For example, a TV remocon UI definition file is stored in the UI definition file memory area 52, correspondingly to a TV remocon application for remotely controlling a TV set (not shown), which is an external equipment, by using the mobile phone 1. Similarly, an air conditioner remocon UI definition file is stored in the UI definition file memory area 52, correspondingly to an air conditioner remocon application for remotely controlling an air conditioner (not shown), which is another external equipment, by using the mobile phone 1.

In the present embodiment, a UIML (User Interface Markup Language) form based on XML language is used as an example of a language to describe the UI definition file. In order to activate a UI to use, the UI generation unit 13 displays the UI on the display unit 24 of the touch panel 20 of the mobile phone 1 in accordance with definition described in the UIML form, and the application execution unit 11 executes processing in response to input to the input unit 22 by the user.

Figure 2:
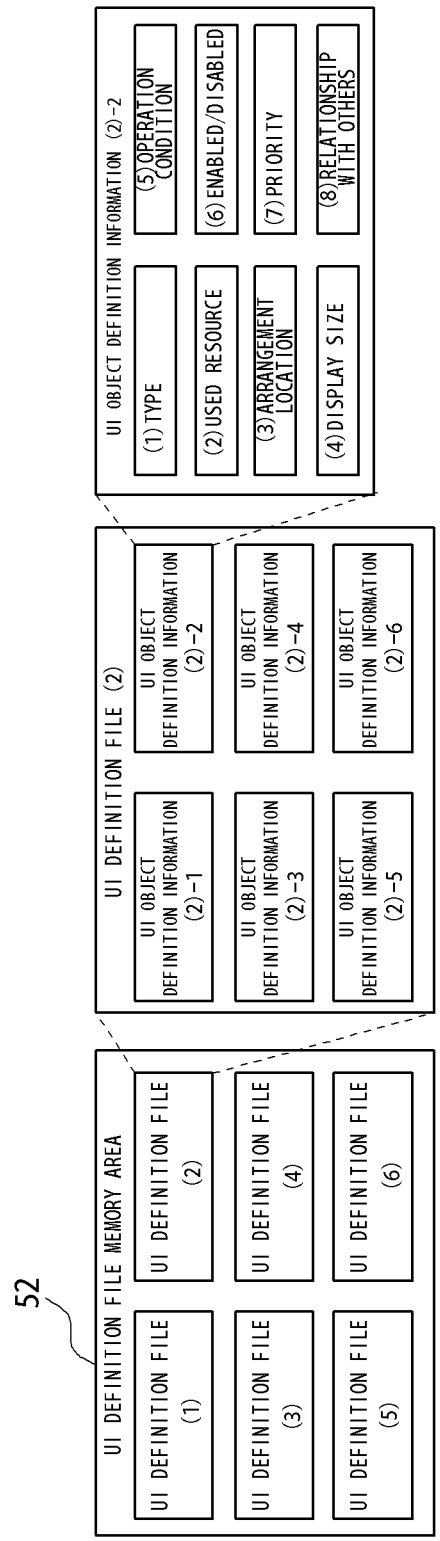
FIG. 2 is a conceptual diagram illustrating a constitution of a user interface definition file according to the present invention.

FIG. 2 is a conceptual diagram illustrating a configuration of the UI definition file. As shown in FIG. 2, the UI definition file memory area 52 of the memory unit 50 of the mobile phone 1 stores the UI definition file defining a sequence of generation rules to generate an entire UI. Although six UI definition files (1) to (6) are stored in FIG. 2, the UI definition file memory area 52 may store any number of UI definition files in accordance with UIs to be used.

In addition, as shown in FIG. 2, each UI definition file includes a plurality of UI object definition information. Although the UI definition file (2) includes six UI object definition information ((2)-1 to (2)-6) in FIG. 2, the UI definition file (2) includes the UI object definition information as many as the UI objects included in the UI composed based on the UI definition file (2), in practice.

Each UI object definition information included in the UI definition file includes information indicating various attributes in relation to the UI object defined by the UI object definition information, as shown in the figure. The followings are examples of representative information included in the UI object definition information:

(1) type information of a component (UI object): information specifying a type, such as whether the UI object has a function of button or key to receive a user operation, a text box function for information display, or a function simply displaying an image on the display unit 24;

(2) resource information used for the UI object: information defining image and text for displaying the UI object such as a key or button, which is a component of the UI to be displayed on the display unit 24;

(3) location information for arranging the UI object: information specifying where to display the UI object in a predetermined UI display area;

(4) information on a display size of the UI object: information specifying a size of the UI object when displayed in the UI display area;

(5) operational condition information of the UI object: information specifying an operation to an application when there is input to the UI object (when there is input to a portion of the input unit 22 corresponding to the UI object, in practice);

(6) information to enable or disable the UI object: information specifying whether to display the UI object in the UI display area or whether to activate the UI object;

(7) priority order information of the UI object: information indicating priority of the UI object, when a plurality of UIs are compounded, based on a relationship between the UI object and other UI objects; and (8) relationship information between the UI object and other UI objects: information, when the UI object has a predetermined relationship with another UI object, specifying the relationship.

According to the present embodiment, a plurality of UI objects are displayed in a single UI display area based on selection by the user. At this time, it is possible to select a plurality of UI objects from a single UI or from a plurality of UIs. Although each UI has a corresponding UI definition file, the compound UI composed of the UI objects arbitrarily selected by the user does not have a corresponding UI definition file originally. Therefore, when the compound UI composed of the UI objects selected by the user is generated, a compound UI definition file is generated and stored based on the compound UI.

Figure 3:
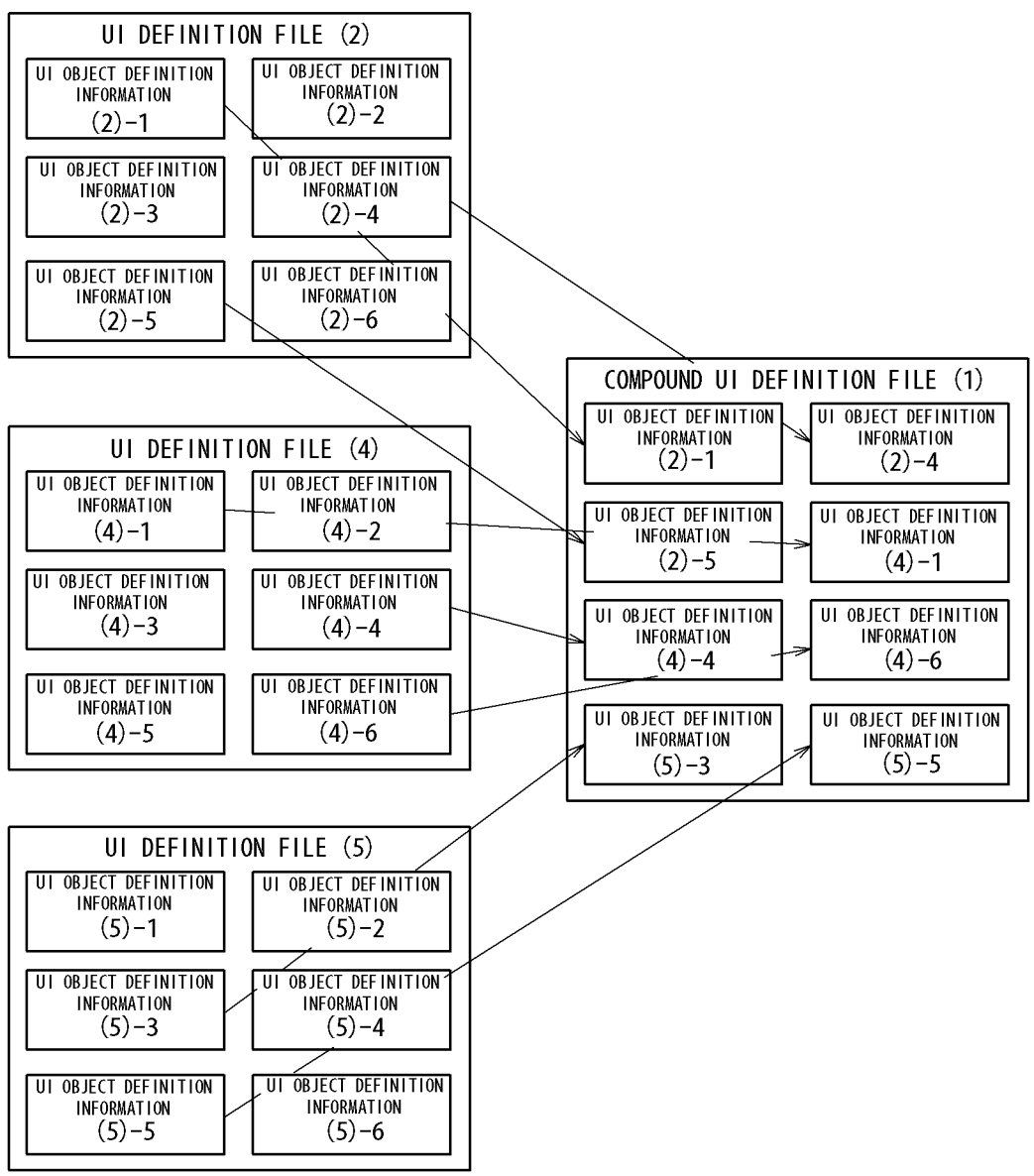
FIG. 3 is a conceptual diagram illustrating a constitution of a compound user interface definition file according to the present invention.

FIG. 3 is a conceptual diagram illustrating a configuration of the compound UI definition file. The compound UI definition file is a single UI definition file having extracted parts of the UI object definition information included in the plurality of UI definition files, collectively. When a plurality of UIs are compounded, the UI object selection processing unit 62 of the UI compound processing unit 60 generates the UI object selection screen based on each UI definition file and extracts UI object definition information of the UI objects selected by the user. The compound UI definition file generation unit 63 collects extracted UI object definition information into a single compound UI definition file. This means that, from the user's point of view, the UI objects are selected from the plurality of UIs and used to generate a single compound UI. In generating the compound UI definition file, the UI compound processing unit 60 may process the UI object definition information as necessary before being collected into the single definition file of the compound UI. In the example shown in FIG. 3 is shown a conceptual diagram of generation of a new compound UI definition file (1) by gathering some extracted UI object definition information from three UI definition files (2), (4) and (5).

Figure 4:
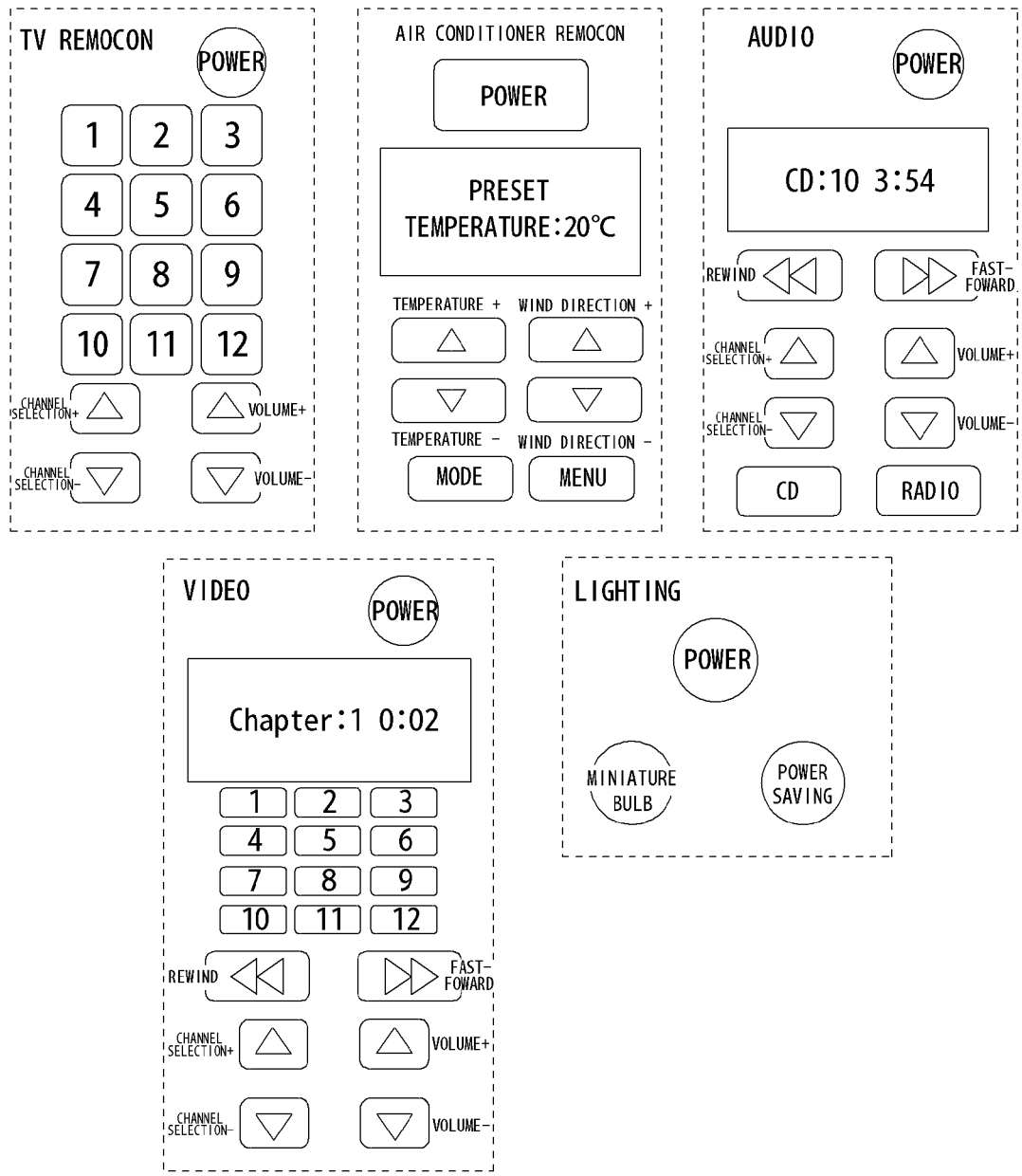
FIG. 4 is a diagram illustrating user interfaces for a variety of remocon application generated based on respective user interface definition files.

For example, FIG. 4 is a diagram illustrating exemplary UIs for a variety of remote applications, generated based on user interface definition files shown in FIG. 2 and FIG. 3. If the UI definition file is described in a file format of UIML based on XML and a UI is generated by analyzing such UIML files, the UI for a single screen is generated to fit in the predetermined UI display area of the display unit 24. In the UI definition file of each UI, various attributes of the UI objects composing the UI are defined by the UI object definition information.

Such UI may be composed on the assumption of individual usage (that is, not assumed to be used as a compound UI). In this case, however, if the UI compound processing unit 60 performs the above processing to generate a compound UI, it is possible to generate a compound UI definition file for composing a single compound UI employing a plurality of UI objects selected by the user arbitrarily.

Next, automatic layout processing to generate a compound UI according to the present embodiment is described. According to the present embodiment, when the compound UI is generated by compounding UI objects of a plurality of UIs, the plurality of UI objects are automatically selected and arranged in the predetermined UI display area on the display unit 24. That is, according to the automatic layout processing, the UI compound processing unit 60 performs processing to select the UI objects in accordance with a predetermined condition so as to generate the compound UI, thus there is no need for the user to operate to select each UI object composing the compound UI.

FIG. 4 is a diagram illustrating UIs, composed of UI objects with high priority, to be used for automatic compound of the UIs. These UI objects composing each UI are necessary when each UI instructs execution of basic and important functions based on each corresponding application The UI definition file corresponding to each UI includes the UI object definition information of all UI objects. In addition, the UI object definition information included in the UI definition file of each UI includes "priority order information" of (7) stated above, which indicates priority order of each UI object in the UI.

The priority order information indicates whether each UI object composing the UI, when a plurality of UIs are compounded automatically, should be always selected as an essential UI object, is preferably selected as an important UI object, or has lower importance comparing to other UI objects and thus can be omitted according to a conditions. Each UI shown in FIG. 4 extracts the essential UI objects and UI objects with high priority based on the UI object definition information included in each UI definition file. Thus, the UI objects which should be selected when UIs are compounded are defined in advance.

In addition, in order to specify the UI object which should be selected when the UI objects are automatically selected and arranged, a predetermined threshold of the priority order is provided to the priority order information. Thereby, the UI object with the priority order within the threshold is always selected. The priority order information included in the UI object definition information of the essential UI object is hereinafter referred to as "essentiality information".

The following is a description about the automatic layout processing to automatically compound all UIs shown in FIG. 4. Since each UI shown in FIG. 4 is normally used solely, it is not possible to compound all the UIs as they stand to arrange in the predetermined UI display area on the display unit 24. Accordingly, the automatic layout processing is performed, which includes processing to reduce each UI object while setting an adequate margin to each UI object so as to retain operability.

Figure 5:
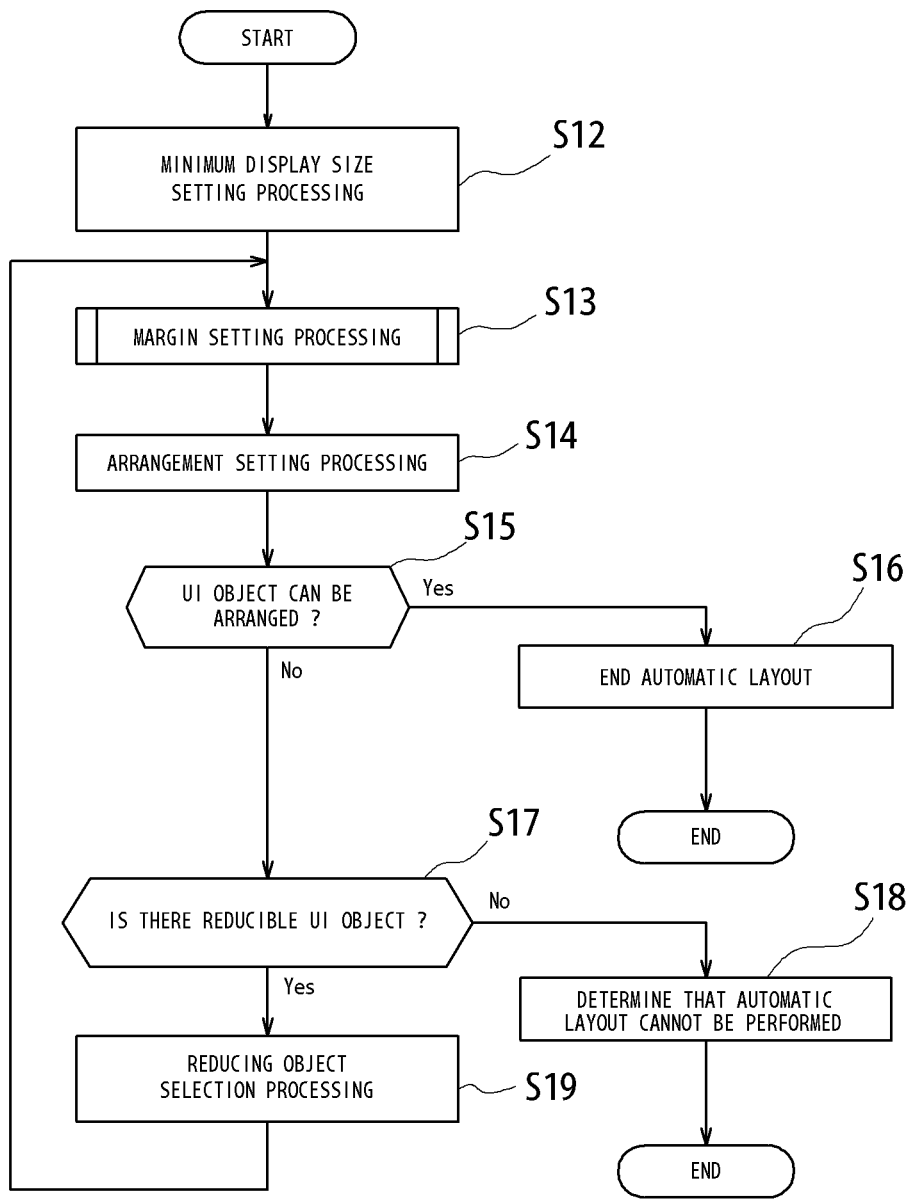
FIG. 5 is a flowchart illustrating automatic layout processing according to an embodiment of the present invention.

FIG. 5 is a flowchart illustrating the automatic layout processing of the UI objects according to the present embodiment. When the automatic layout processing starts, the minimum size setting unit 74 sets a minimum display size (minimum value) to be used when reducing the UI object, for each UI object included in a plurality of selected UIs (step S12). In this processing, the minimum value for reduction is set to prevent the UI compound processing unit 60 from reducing the UI object too much and thereby deteriorating operability, in reducing processing of the UI object.

In the setting processing of the minimum display size of the UI object, the minimum size setting unit 74 determines a suitable minimum value, corresponding to a type of each UI object, to the UI object definition information of each UI object included in each UI definition file analyzed by the UI object definition information analysis unit 61. The minimum display size, when reducing each UI object, may be set based on various parameters.

For example, the minimum size setting unit 74 sets a predetermined minimum display size based on a type of the UI object, to which a minimum display size is set, such as a user operation type such as a button, a checkbox and the like, or a type just for displaying an image and the like. That is, the UI object just for displaying an object may be reduced significantly so far as maintaining visibility, whereas the UI object of the user operation type is set not to be reduced too much in order to maintain operability.

In addition, the minimum size setting unit 74 sets a minimum display size of a UI object based also on the terminal-dependent information stored in the terminal-dependent information memory area 57. The terminal-dependent information includes information based on configuration and specifications of the input unit 22 when the user inputs with a finger, and input device information when the user input with a special input device such as the stylus. If the UI object to be reduced is the user operation type and the stylus, for example, is used to input, it is possible to set a much smaller minimum value than that for when the user inputs with the finger. This is because the stylus enables the user to perform finer operations than when the user inputs with the finger.

Thereby, the minimum size setting unit 74 updates an initial value of a coefficient which has been set and sets a new coefficient for each UI object based on information indicative of various attributes included in the UI object definition information of each UI object and various terminal-dependent information (apparatus-dependent information) stored in the terminal-dependent information memory area 57. It is thus possible to prevent the UI object from being reduced too much in the reducing process, thereby avoiding deterioration of operability and visibility.

Next, the margin setting unit 75 performs margin setting processing to set a margin, when arranging each UI object, between the UI object and an adjacent UI object (step S13). The margin setting processing prevents the UI objects from being arranged too close to one another and deteriorating operability for the user. A detailed description of the margin setting processing will be provided below.

Next, the arrangement setting unit 71 performs arrangement setting processing to virtually arrange each UI object based on default display size information included in the UI object definition information and the margin set by the margin setting processing at step S13 (step S14). At this time, the arrangement setting unit 71 arranges the UI objects included in the same UI definition file close to one another. In addition, based on the "relationship information between the UI object and other UI objects" of (8) described above analyzed by the UI object definition information analysis unit 61 and the like, the arrangement setting unit 71 arranges highly related UI objects, among the UI objects included in the same UI definition file, close to one another, reflecting a relative positional relationship (positional relationship in UI to which the UI objects originally belong).

When the arrangement setting processing at step S14 is completed, the arranging availability determination unit 72 determines whether all UI objects of the compound UI can be arranged to fit in the predetermined UI display area, based on virtual arrangement of the UI objects by the arrangement setting processing (Step S15). If it is determined that all UI objects can be arranged (Yes of step S15), the automatic layout processing unit 70 actually displays virtually arranged UI objects on the display unit 24 and thus completes the automatic layout processing (step S16).

In contrast, if it is determined that the all UI objects of the compound UI cannot be arranged to fit in the predetermined UI display area, the reducing object selection unit 73 determines whether there is a UI object which can be reduced, based on a result of the minimum display size setting processing at step S12 (step S17).

If it is determined that there is no UI object which can be reduced at step S17, the automatic layout processing unit 70 determines that automatic layout cannot be performed (step S18) and ends the automatic layout processing. At this time, the automatic layout processing unit 70 can display that automatic layout cannot be performed on the display unit 24. In addition, at this time, it is preferred to require the user to reselect UI objects to be arranged or to reselect UIs to be compounded. Such processing prevents forcible compound of UIs sacrificing operability.

If it is determined at step S17 that there is a UI object which can be reduced, the automatic layout processing unit 70 selects and reduces the UI object, which is selected as the one whose display size should be reduced first by the reducing object selection unit 73 (step S19). In this case, the reducing processing is performed based on the minimum display size set at step S12.

Processing to select the UI object to be reduced at step S19 is performed based on the priority set for each UI object included in the UI object definition information, for example. That is, based on the priority order information included in the UI object definition information of each UI object, the UI object with a low priority order is determined as less important and thus selected as the UI object which should be reduced first.

In the processing to select the UI object to be reduced at step S19, if the user selects UI objects to adopt, it is also possible to select a UI object to be reduced, based on the order of selection. For example, the UI objects selected earlier are determined as important UI objects which should not be reduced first, whereas the UI objects selected later are determined as less important UI objects and thus reduced first. If the UI object to be reduced is automatically selected, it is possible to select the UI object to be reduced based on a type of a selected UI object included in the UI object definition information, or to group UI objects originally defined in the same UI definition file and select the UI objects to be reduced on a group basis.

After the reducing processing at step S19, through the margin setting processing (step S13) and the arrangement setting processing (step S14) once again, the arranging availability determination unit 72 determines whether the compound UI can be arranged in the predetermined display area (step S15). Thereafter, such processing is repeated until the automatic layout processing is completed (step S16) or it is determined that the automatic layout cannot be performed (step S18).

If all UIs shown in FIG. 4 are automatically compounded by the above automatic layout processing, a compound UI is generated as shown in FIG. 6, for example. If the input means is the user's finger, a compound UI as shown in FIG. 6(A) is generated, which is based on a minimum reducing value corresponding to a contact area of the finger. If the input means is the stylus, a compound UI as shown in FIG. 6(B) is generated, which is based on a minimum reducing value corresponding to a contact area of the stylus. As obvious from a comparison of FIG. 6(A) and FIG. 6(B), since a minimum value of the UI object (of the user operation type) for input with the stylus can be set smaller, it enables more UI objects to be arranged.

In the following description, a size of a standard contact area on the input unit 22 of the touch panel 22 touched by an operation means when the user operates the mobile phone 1 is referred to as a "standard size". An exemplary standard size based on a "size of the contact area by the finger" and an exemplary standard size based on a "size of the contact area by the stylus" are shown in upper areas of FIG. 6(A) and FIG. 6(B), respectively.

Those standard sizes may differ for each user and for each operation means (finger or stylus), it is preferred to set each standard size to a predetermined value in advance, and to encourage the user to register each standard size when the user initiates the mobile phone 1 for the first time and performs initial setting. When each standard size is registered, it is stored as the terminal-dependent information (apparatus-dependent information) in the terminal-dependent information memory area 57 of the memory unit 50. The standard size when using a terminal attachment device such as the stylus as the operation means may be registered in advance as the terminal-dependent information.

When the compound UI is thus generated, the compound UI definition file generation unit 63 generates a compound UI definition file corresponding to the compound UI generated. The UI compound processing unit 60 stores the compound UI definition file generated in the compound UI definition file memory area 56. Thereafter, the UI generation unit 13 can reproduce the compound UI, if generated once, on the display unit 22 of the touch panel 20 by reading out the compound UI definition file stored in the compound UI definition file memory area 56.

Next, UI re-compound processing accompanying change of the operation means according to the present embodiment is described. This processing re-compounds the compound UI being used corresponding to the current operation means if the operation means used by the user to input is changed while the compound UI generated is used.

Figure 7:
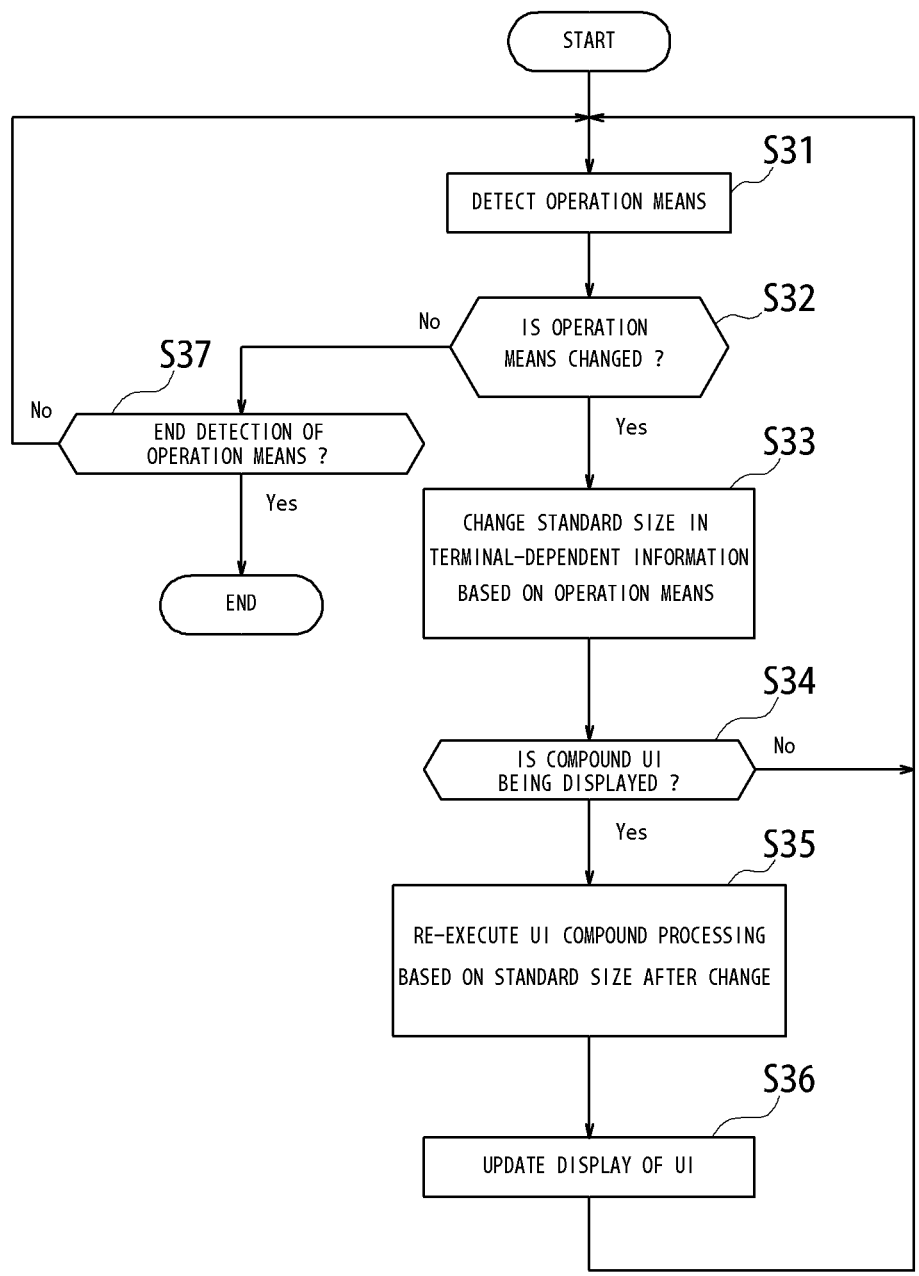
FIG. 7 is a flowchart illustrating the UI re-compound processing accompanying the change of the operation means according to the embodiment of the present invention.
Figure 8:
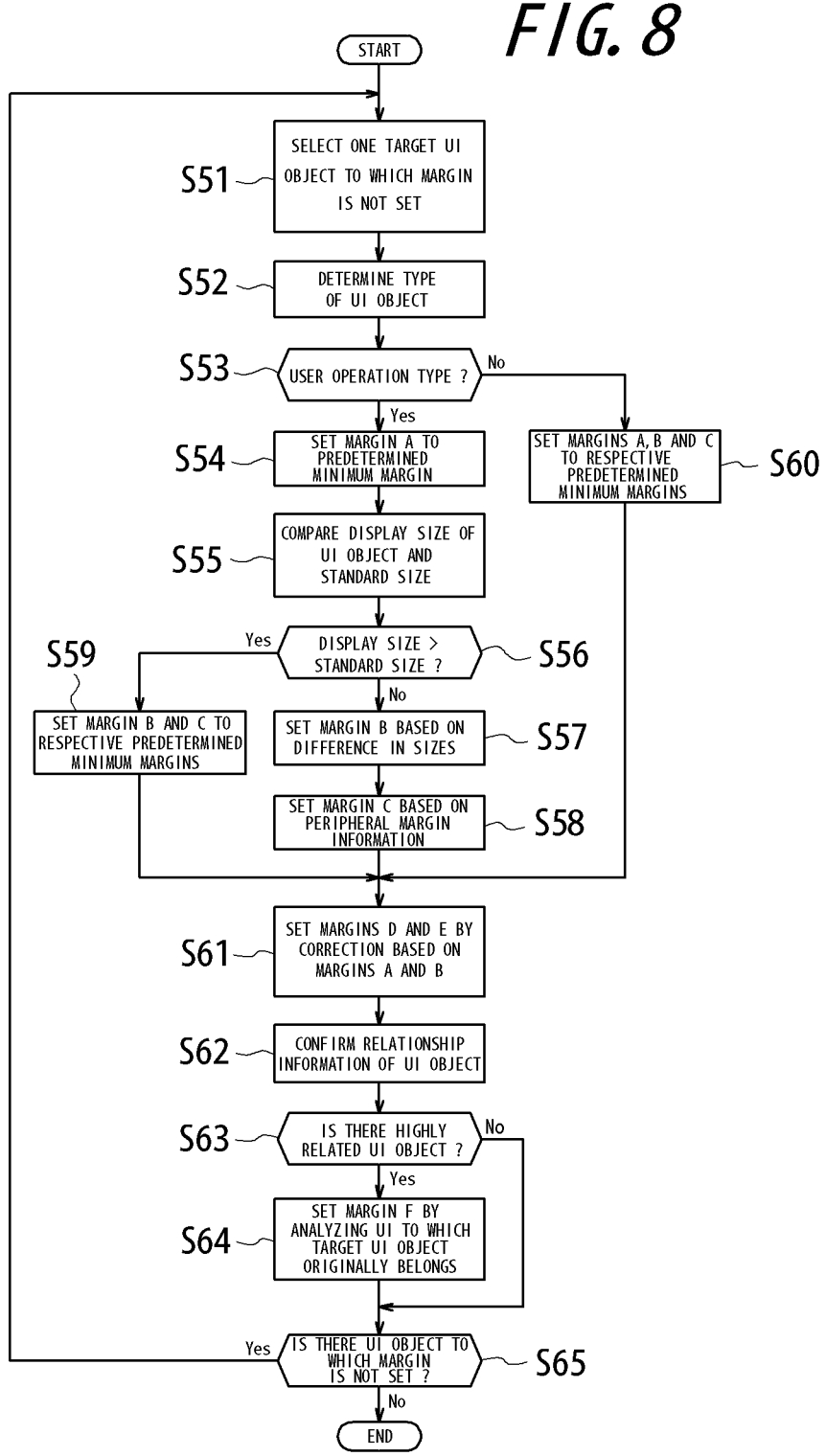
FIG. 8 is a flowchart illustrating detailed margin setting processing according to the embodiment of the present invention.

The following is a description of the UI re-compound processing accompanying change of the operation means according to the present embodiment with reference to a flowchart shown in FIG. 7.

After starting a mode to detect change of the operation means (hereinafter, referred to as an "operation means detection mode"), the operation means detection unit 14 of the control unit 10 detects the operation means used by the user to input operation (step S31). That is, the operation means detection unit 14 monitors input from the input unit 22 of the touch panel 20, the operation key unit 80 and the stylus storage unit 90, to detect input from each of these function units. When detecting input, the operation means detection unit 14 determines whether the operation means is changed based on the input (step S32).

For example, if input from the touch panel 20 is detected and input from the operation key unit 80 used to be detected therebefore, the operation means detection unit 14 determines that the operation means is changed from the operation key unit 80 to the touch panel 20.

In addition, if the contact area of input to the input unit 22 of the touch panel 20 changes to be larger than a predetermined value, the operation means detection unit 14 determines that the operation means changes from the stylus to the "finger" of the user. In contrast, if the contact area of input to the input unit 22 of the touch panel 20 changes to be smaller than a predetermined value, the operation means detection unit 14 determines that the operation means changes from the finger to the stylus.

Moreover, if it is detected that the stylus is taken out of the stylus storage unit 90, the operation means detection unit 14 determines that operation will be performed with the stylus on the touch panel 20 thereafter. In contrast, if it is detected that the stylus is stored in the stylus storage unit 90, the operation means detection unit 14 determines that operation will be performed with the finger on the touch panel 20 or with the operation key unit 80 thereafter.

As stated above, if it is determined that the operation means is changed at step S32, the UI compound processing unit 60 changes the standard size stored as the terminal-dependent information in the terminal-dependent information memory area 57, in accordance with the operation means detected (step S33). For example, if the operation means changes to the "finger", the standard size is changed to the size based on the contact area of the "finger". Similarly, if the operation means changes to the stylus, the standard size is changed to the size based on the contact area of a tip of the stylus.

Next, the control unit 10 determines whether the UI being displayed on the display unit 24 of the touch panel 20 is the compound UI generated based on the compound UI definition file (step S34). If the UI being displayed on the display unit 24 is not the compound UI (that is, the UI assumed to be used solely), there is low necessity to add a UI object composing UI other than the UI currently displayed, even if the standard size is changed because of change of the operation means. That is, if the UI, assumed to be used solely is being used, there is low necessity to change composition of the UI by performing the UI re-compound processing of the UI currently displayed. Therefore, in such a case, without performing changing (re-compound) processing to the UI, the control unit 10 returns to step S31.

In contrast, if the UI displayed on the display unit 24 is the compound UI at step S34, the UI compound processing unit 60 performs the UI compound processing again on UI objects included in the compound UI definition file of the compound UI, based on the standard size changed at step S33 (step S35). At this time, the UI compound processing is performed again based on a suitable margin among various margins set at step S13 in FIG. 5. Then, the UI generation unit 13 displays each UI object to which the UI compound processing is performed again on the display unit 24, so as to update display of the UI (step S36). After that, the processing flow returns to step S31 to detect next change of the operation means.

If the operation means is not changed at step S32, it is determined whether detection of change of the operation means is finished, that is, whether the operation means detection mode is finished (step S37). If the operation means detection mode is not finished yet, the processing flow returns to step S31 to detect next change of the operation means. If it is detected that the operation means detection mode is finished at step S37, the UI re-compound processing accompanying change of the operation means is finished. Accordingly, the operation means detection unit 14 constitutes an operation input means determination unit according to the present embodiment.

Thereby, if the operation means for input by the user is changed, the mobile phone 1 determines a new operation means and provides the user with an optimum compound UI according to each operation means. That is, if the stylus is taken out of the stylus storage unit 90 while the compound UI as shown in FIG. 6(A) is displayed on the display unit 24 of the touch panel 20, the compound UI is re-compounded and the screen changes to display the compound UI as shown in FIG. 6(B). That is, more UI objects in smaller sizes are displayed for operation with the stylus, than those for operation with the finger. Then, when the stylus is stored in the stylus storage unit 90, the screen returns to the compound UI as shown in FIG. 6(A), which is suitable for operation with the finger.

In addition, even after the stylus is taken out and the screen changes to the compound UI as shown in FIG. 6(B), if the user touches the touch panel 20 with the finger for input operation without using the stylus, the screen can be switched to the compound UI as shown in FIG. 6(A) based on the contact area (standard size) of the finger. Then, the screen may be changed to the compound UI as shown in FIG. 6(B) when the stylus touches the touch panel 20.

In addition, it is also possible to switch the compound UI to be displayed on the display unit 24 to a compound UI for operation with the operation keys (that is, do not use the touch panel), in response to operation to press a key constituting the operation key unit 80. Moreover, it is also possible to display the compound UI suitable for operation with the pointer displayed on the display unit 24 when the pointer is displayed to specify input spot on the display unit 24. If the terminal can customize an image of the pointer, it is possible to calculate a standard size based on a size of the image of the pointer displayed and display the compound UI in accordance with the standard size.

Next, the margin setting processing (at step S13) in the automatic layout processing described with reference to FIG. 5 is described in detail. The margin setting processing at step S13 of the automatic layout processing shown in FIG. 5 sets a margin (space) necessary between adjacent UI objects when each UI object is arranged. The margin of each UI object can be set based on a variety of conditions and a variety of margins can be defined.

According to the present embodiment, in arranging the UI objects, first all margins possibly used among the various margins are set. By setting all margins first, it is possible to use a suitable margin corresponding to a layout even if the layout processing is performed with the UI objects in any ways.

The margin setting processing according to the present embodiment sets six types of margins of a margin A to a margin F to each UI object. The margin setting processing sets a suitable margin based on a correlation of a UI object and another UI object which may be arranged adjacent to the UI object.

The following is a list of descriptions of each of the margin A to the margin F. Hereinafter, a UI object to which a margin is set is referred to as a "target UI object" and a UI object adjacent to the target UI object is referred to as an "adjacent UI object". Margin A: a margin for when the target UI object and the adjacent UI object are originally included in the same UI definition file but of different types according to the "UI object type information" of (1) described above.

(It is to be noted that "originally included in the same UI definition file" means that the UI objects are included in the same UI when the UI is activated solely. In addition, "of different types according to the UI object type information" means a case such as that, for example, one of the UI objects is a button or a key to receive a user's operation, whereas the other UI object is a text box, an image display and the like not to receive a user's operation)

Margin B: a margin for when the target UI object and the adjacent UI object are originally included in the same UI definition file and of the same type according to the "UI object type information" of (1).

Margin C: a margin for when the target UI object is arranged at the edge of the display unit 24 of the touch panel 20.

Margin D: a margin for when the target UI object and the adjacent UI objects are originally included in different UI definition files and of different types according to the "UI object type information" of (1).

Margin E: a margin for when the target UI object and the adjacent UI objects are originally included in different UI definition files and of the same type according to the "UI object type information" of (1).

Margin F: a margin for when the "relationship information of UI objects" of (8) described above, included in each of the UI object definition information of the target UI object and that of the adjacent UI object indicate that these UI objects are highly related. (It is to be noted that the UI objects "highly related according to the relationship information" are UI objects considered to be used as a "pair" or as a group such as UI objects of up/down of channel selection of the TV remocon UI or UI objects of up/down of volume of an audio remocon UI.)

The following is a description of a flow of the margin setting processing according to the present embodiment with reference to a flowchart in FIG. 8 and FIG. 9 to FIG. 16.

First, when the margin setting processing is started, the margin setting unit 75 selects one UI object, to which a margin is not set, as the target UI object among UI objects selected to compose a compound UI (step S51). Once the target UI object is selected, the margin setting unit 75 analyzes the UI object definition information of the target UI object selected and determines the "type of the UI object" of (1) (step S52).

Determination of the type of the target UI object enables setting of a margin corresponding to a function of each UI object. FIG. 9 is a diagram illustrating exemplary margins set according to the function of each UI object in this manner. Each row indicates the type of UI object and shows exemplary UI objects having a function of Button, TextBox, Checkbox or Scrollbar, in the order from the left to the right. A dashed line surrounding each UI object shows a margin set to the UI object. It is preferred to virtually set the margin and not to display dashed line on the display unit 24.

For a UI object such as a key or button, expected to be operated by user's finger or the stylus, a margin is set correspondingly to the input means. That is, if a UI object of the button assuming input by the finger is small, it is necessary to set a sufficient margin in consideration of the contact area of the user's finger, as shown in the figure. In contrast, for the UI object of the button assuming input by the stylus or the key, a (almost fixed) margin not very dependent on a size of the UI object can be set as shown in the figure, as it is possible to input finely indicating a position. Here, an "input by the key" assumes an input to move and determine an available choice displayed on the display unit 24 by using a direction key and the like of the operation key unit 80 or an input to select a UI object by moving a pointer by using the direction indication device of the operation key unit 80. In addition, if the type of the UI object is the textbox, which does not receive a user's input, a fixed small margin can be set regardless of the input means. If the type of the UI object is the checkbox or the scrollbar, it is necessary to set a margin in consideration of the input means to some degrees, as shown in the figure.

Figure 10:
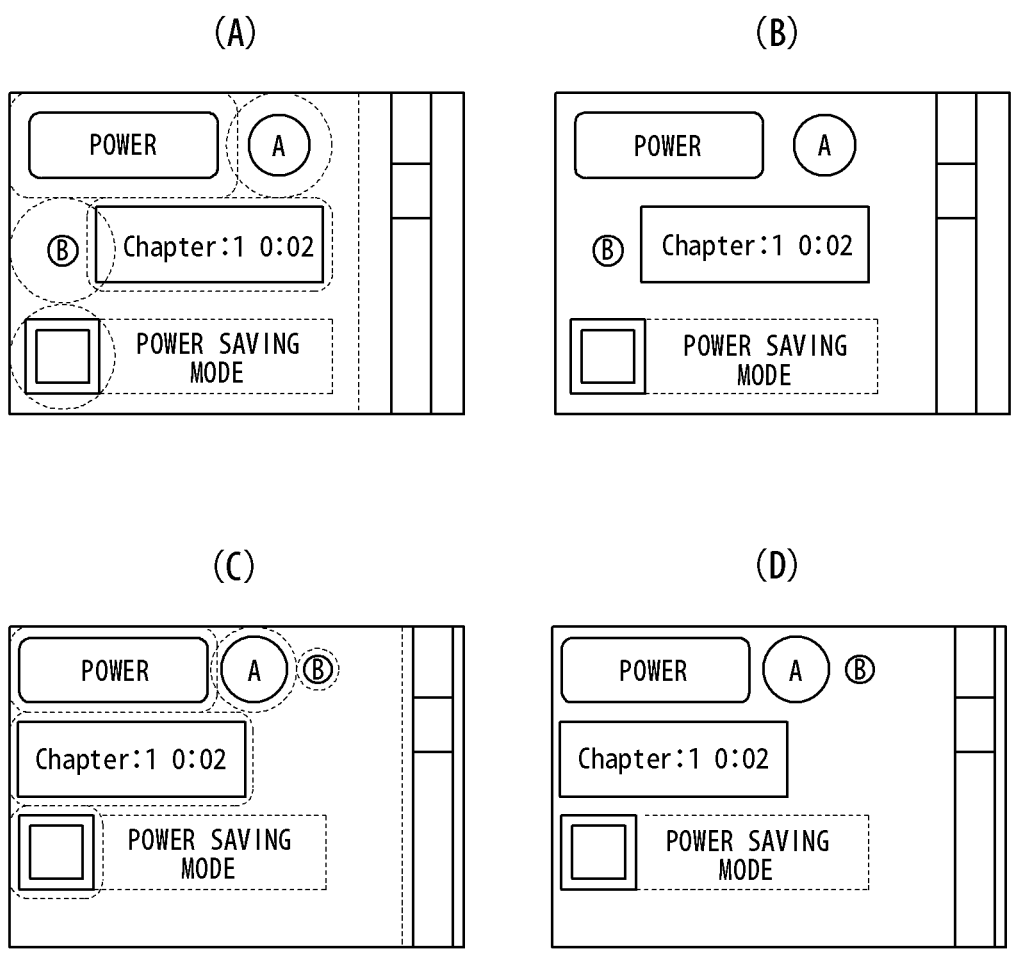
FIG. 10 is a diagram illustrating exemplary arrangement of the user interface objects based on the margin set in FIG. 9.

Setting a margin based on the type of each UI object in consideration of the input means and designing a layout based on the margin in the manner stated above can provide arrangements as shown in FIG. 10, for example. FIGS. 10(A) and (B) show exemplary compound UIs generated by setting margins for when the input means is the user's finger and providing a predetermined layout according to the margins. FIG. 10(A) shows a diagram visualizing virtual margins with dashed lines, whereas FIG. 10(B) shows an exemplary diagram actually displaying the UI objects. FIGS. 10(C) and (D) show exemplary compound UIs generated by setting margins for when the input means is the stylus. FIG. 10(C) shows margins with dashed lines, whereas FIG. 10(D) shows an exemplary diagram actually displaying the UI objects. Accordingly, if the user inputs with the finger, a sufficient margin is set in consideration of operability to provide plenty of space between the buttons. In contrast, for fine input by using the stylus and the like, a small margin is set, which enables to efficiently utilize the UI display area. In this case, more UI objects can be added.

Next, if a result of determination on the type of the target UI object is the button or the key to receive a user's operation (hereinafter, referred to as the "user operation type") at step S53, the margin setting unit 75 sets a predetermined minimum margin as the margin A (step S54). The margin A is used when the target UI object and the adjacent UI object are of different types, and at step S54 is set a margin for when an adjacent UI object which is not of the user operation type is arranged around the target UI object of the user operation type. If the adjacent UI object arranged around the UI object of the user operation type is not of the user operation type, a miss-operation to touch such adjacent UI object is not regarded as an input. Therefore, since operability is not deteriorated even if these UI objects are arranged close to each other as long as both of UI objects adjacent are not of the user operation type, the minimum margin is set as the margin A.

Next, the margin setting unit 75 compares the "information on a display size of the UI object" of the above (4) stored in the UI object definition information of the target UI object and the standard size stored in the terminal-dependent information memory area 57 (step S55). As stated above, the "standard size" is a standard size of the contact area on the input unit 22 of the touch panel 20 contacted by the operation means, that is, a size of the contact area of the user's finger or the stylus for operation.

If the display size of the UI object of (4) is not larger than the standard size at step S56, the margin setting unit 75 sets a margin B based on a difference between the display size of the UI object of (4) and the standard size (step S57). Here, a case where the display size of the UI object of (4) is not larger than the standard size means that the contact area of the finger to input is larger than the display size of the target UI object as shown in FIG. 11(A). In this case, if the UI objects of the user operation type are adjacent to one another, the user may touch the adjacent UI object unintentionally. Accordingly, it is necessary to set a sufficient space as the margin B, which is used when the target UI object and the adjacent UI object are of the same type.

Setting a margin corresponding to the adjacent UI object and designing a layout based on the margin in the manner stated above provides arrangements as shown in FIG. 12, for example. FIG. 12(A) shows an exemplary arrangement of multiple UI objects of the user operation type (button B) based on the margin for the UI objects of the same type, that is, based on the margin B. Since each UI object is arranged not to overlap a margin of another UI object, which is set as the margin B, it may prevent the UI objects of the user operation type from being arranged too close to one another. Accordingly, it reduces possibility that the user touch the adjacent UI object by mistake when operating with the finger.

FIG. 12(B) is a diagram illustrating an exemplary arrangement of some UI objects of the user operation type based on the margin for the UI objects of different types, that is, the margin A. If an UI object adjacent to a UI object of the user operation type (button B) is not of the user operation type (for example, the text box), operability will not be deteriorated even if these UI objects are arranged close. This is because only the UI object of the user operation type accepts an input by the user even if the user touches the adjacent UI object by mistake. Accordingly, if the UI objects of different types are adjacent to one another, it is possible to arrange the UI objects closely so as to effectively utilize the UI display area.

Once the margin B is set, the margin setting unit 75 next sets a margin C based on information on an periphery portion of the display unit 24 of the touch panel 20 (hereinafter, referred to as "periphery margin information") stored in the terminal-dependent information memory area 57 (step S58). In this case, since the contact area of the finger to input is larger than the display size of the target UI object, if a comparatively small target UI object is arranged close to the periphery of the display unit 24, it makes difficult for the user to touch the target UI object. Accordingly, it is necessary in this case to set a sufficient margin as the margin C based on the periphery margin information, which is the terminal-dependent information (apparatus-dependent information).

Setting a margin based on the periphery margin information and designing a layout based on the margin in this manner provides arrangements as shown in FIG. 13, for example. As shown in FIG. 13(A), since a display size of a UI object of a "Power" button of the user operation type is larger than the standard size, that is, than the contact area of the finger, it will not deteriorate operability even if the "Power" button is arranged at the edge of the UI display area (left end in FIG. 13(A)). However, since a display size of a button B of the user operation type is smaller than the standard size, that is, than the contact area of the finger, it will deteriorate operability (make it difficult to touch) if the button B is arranged too close to the edge of the UI display area. Therefore, a margin C is set for such a UI object so as not to be too close to the edge of the UI display area. Margins of the UI objects are virtually shown by dashed lines in FIG. 13(A) and actual display on the display unit 24 is shown in FIG. 13(B).

In addition, it is also possible to set the margin C based on a peripheral shape of a member surrounding the touch panel 20. That is, if the member surrounding the touch panel of the mobile terminal is chamfered at the periphery adjacent to the touch panel and the terminal is in the shape as shown in FIG. 14(B) when viewed from a side, the user can touch a UI object with the finger even if it locates at the edge of the touch panel. For such terminal, arrangement of the UI object such as the button at the edge of the UI display area (right edge in FIG. 14(A)) as shown in FIG. 14(A) does not deteriorate operability. Accordingly, in this case, it is possible to effectively utilize the UI display area by setting the margin C so as to arrange the UI object close to the edge of the UI display area.

In contrast, if the member surrounding the touch panel of the mobile terminal is not chamfered at the periphery adjacent to the touch panel, the margin C is set so as not to arrange the UI object such as the button too close to the edge of the UI display area (right edge in FIG. 14(C)) as shown in FIG. 14(C). This is because the user cannot touch a position at the edge of the touch panel of such terminal with the finger as shown in FIG. 14(D).

In order to perform such processing, information on the shape of the member surrounding the touch panel of the mobile terminal at the periphery adjacent to the touch panel, that is, information determined based on the shape of the member, which defines the periphery of the display unit, is stored as the terminal-dependent information in the terminal-dependent information memory area 57 in advance.

Once the margin C is set, the margin setting unit 75 next sets margins D and E based on the margins A and B already set (step S61). Both of the margins A and D are used when the target UI object and the adjacent UI object are of different types, whereas both of the margins B and E are used when the target UI object and the adjacent UI object are of the same type. In this regard, those margins have similarities therebetween, respectively. However, the margins A and B are used when the target UI object and the adjacent UI object are originally included in the same UI definition file.

In contrast, the margins D and E are used when the target UI object and the adjacent UI object are originally included in different UI definition files. When a compound UI is generated, UI objects originally included in the same UI definition file should be set closer than UI objects originally included in different UI definition files, in order to facilitate visual recognition of an organized group of the UI objects. Accordingly, the margin setting unit 75 sets the margins D and E by modification such as setting a slightly larger margin than the margins A and B, which are already set.

For example, as shown in FIG. 15(A), margin (1) for when the UI object and an adjacent UI object belong to different UIs, that is, the margins D and E are respectively set based on margin (2) used when both of the UI objects belong to the same UI, that is, the margins A and B which are already set. If the adjacent UI object originally belongs to the same UI, a slightly small margin is set (for example, such as a default-sized margin, that is, a margin for a single UI), whereas a slightly large margin is set when the adjacent UI object belongs to a different UI. When main UI objects of the air conditioner remocon UI (single UI) shown in FIG. 15(B) and the video remocon UI (single UI) shown in FIG. 15(C) are automatically selected and arranged, a compound UI is generated as shown in FIG. 15(D), for example. As shown in the figure, it is possible to arrange the UI objects belonging to the same UI close to one another, while maintaining operability of each of the UI objects. By setting the margins D and E in this manner, UI objects originally belonging to the same UI are arranged close to one another in configuring a compound UI, and thus the user can easily distinguish each UI visually.

If the "display size of the UI object" of (4) is larger than the standard size at step S56, the margin setting unit 75 sets a predetermined minimum margin as the margins B and C (step S59). The case where the display size of the UI object of (4) is larger than the standard size means that the display size of the UI object is larger than the contact area of the finger to input as shown in FIG. 11(B). In this case, even if the UI objects of the user operation type are adjacent to one another, the user may not touch the UI object adjacent to the target UI object, which is comparatively large, by mistake. In addition, in this case, even if the target UI object which is comparatively large is arranged close to the edge of the display unit 24, it does not make difficult for the user to touch the target UI object. Accordingly, there is no problem in setting the predetermined minimum margin as the margin B, which is used when the target UI object and the adjacent UI object are of the same type, and as the margin C, which is used when the UI object is arranged at the edge of the display unit 24. After step S59, the margin setting processing proceeds to step S61.

In addition, if the target UI object is not of the user operation type as a result of determination at step S53, that is, the target UI object is of a type not to receive a user's operation, the margin setting unit 75 sets predetermined minimum margins as the margins A, B and C (step S60). If the target UI object is not of the user operation type, arranging the UI objects close to one another does not deteriorate operability of the target UI object, regardless of whether the adjacent UI object is of the user operation type. In addition, if the target UI object is not of the user operation type, arranging the target UI object close to the edge of the display unit 24 does not influence user's operation. Accordingly, there is no problem in this case in setting the predetermined minimum margins as the margins A, B and C. After step S60, the margin setting processing proceeds to step S61.

Once the margins A to E are set by processing to step S61, the margin setting unit 75 next confirms "relationship information between the UI objects" of (8) of the target UI object (step S62). As shown in FIG. 16(A), for example, there are UI objects, composing the TV remocon UI used solely, to be used together with a target object as a pair, such as "Channel Selection+" and "Channel Selection−", and "Volume+" and "Volume−". If two or more UI objects are normally used as a "pair" or a group, the UI objects are "highly related". Attribute information of UIML (relate_ID) as shown in FIG. 16(B) is included in advance as the relationship information between the UI objects of (8) in the UI object definition information of the UI objects of the "pair", which are highly related. In the example shown in the figure, each of (Channel Selection+, Channel Selection−) and (Volume+, Volume−) is provided with a common ID as highly related UI objects. For example, the UI objects for channel selection are provided with relate_ID="select_1" as the common ID as shown by (2) and (3) in FIG. 16(B), whereas the UI objects for volume control are provided with relate_ID="volume_1" as shown by (4) and (5) in FIG. 16(B).

If there is a UI object highly related to the target UI object among UI objects composing the compound UI at step S63, the margin setting unit 75 analyzes an original UI used solely including the target UI object. After such analysis, the margin setting unit 75 sets the margin F based on a result of the analysis (step S64). If a UI object is highly related to the target UI object, both of the UI objects are normally included in the same UI used solely. Accordingly, the margin setting unit 75 determines margins set for the UI objects in the original UI used solely and arranges the UI objects closer than other UI objects with no relationship, based on the size of the margin For example, if UI objects not highly related in the original UI are arranged adjacent to one another, these UI objects are arranged at predetermined intervals as shown in FIG. 16(C). Therefore, the user can know that these UI objects are not highly related. In FIG. 16(C), since the UI objects of "Volume" and the UI objects of "Channel selection" are not highly related, certain margins are provided therebetween when they are arranged adjacent to one another. In contrast, if UI objects highly related in the original UI are arranged adjacent to one another, these UI objects are arranged closer comparing to other adjacent UI objects, as shown in FIG. 16(D). Since the UI objects of "Volume" are highly related and so are the UI objects of "Channel selection", the UI objects are arranged close to one another when arranged adjacent. Accordingly, it not only facilitates the user to visually recognize that these UI objects are high related but also improves operability when the UI objects are used as a pair.

As set forth above, a plurality of margins are set to a single UI object by setting of margins A to F. For example, as shown in FIG. 11(A), for the UI object of the button smaller than the standard object, it is preferred to set a size of (1) as the margin A, which is used when the adjacent UI object belongs to the same UI but is of different type and set a size of (2) as the margin D, which is used when the adjacent UI object is of the same type. In addition, it is preferred to set the size of (2) as the margin D, which is used when the adjacent UI object belongs to a different UI and is of the different type and set a size of (3) as the margin E, which is used when the adjacent UI object is of the same type. Moreover, the size (2) is set as the margin C, which is used when the UI object is arranged at the edge of the UI display area. In contrast, as shown in FIG. 11(B), for example, for the UI object of the button larger than the standard size, it is preferred to set sizes of (1), (2), (2) and (3) as the margins A, B, D and E, respectively. The size of (1) is set as the margin C, which is used when the UI object is arranged at the edge of the UI display area. In addition, since there is no UI object highly related to the UI object of the "Power" button to be used therewith as a pair, the margin F is not set thereto.

Once processing to step S64 is finished, the margin setting unit 75 next confirms whether there still are any other UI objects as the target UI objects to which a margin has not been set yet in the UI objects selected to compose the compound UI (step S65). If there is a UI object to which a margin has not been set, the margin setting processing returns to step S51 to continue processing. In contrast, if it is determined that margins are set to all UI objects at step S65, the margin setting processing ends.

The UI compound processing unit 60 inserts various margins set by the margin setting processing set forth above into the UI object definition information of each UI object and stores in the compound UI definition file memory area 56. Accordingly, the UI compound processing unit 60 can use the margin information by reading out from the compound UI definition file memory area 56 and appropriately making a selection based on arranging conditions in the automatic layout processing performed thereafter.

If the automatic layout processing at step S14 and thereafter in FIG. 5 is performed without setting margins by the margin setting processing as described above (that is, skipping step S13 in FIG. 5), it may generate a compound UI with no margin as shown in FIG. 17(A), for example. FIG. 17(A) shows a result of the automatic layout processing by selecting the main UI objects from four UIs (1) to (4) to be used solely. Since a margin is not set for each UI object in such a compound UI, it deteriorates operability as well as visibility for the user.

If the automatic layout processing at step S14 and thereafter in FIG. 5 is performed after setting margins by the margin setting processing according to the present embodiment (that is, after step S13 in FIG. 5), a compound UI with suitable margins is generated as shown in FIG. 17(B), for example. Such compound UI having suitable margins not only improves operability dramatically but also looks well-organized, and thus reduces miss-operation by the user because of poor visibility. When the compound UI is actually generated, it is also possible to further improve visibility of a function of each UI object by painting each UI object itself or its background (margin, for example) in different colors to distinguish original UIs to which the UI objects belong.

It is to be noted that the present invention is not limited to the embodiment set forth above but many variations or modifications can be made. For example, in the present embodiment, all of various margins to be possibly used are set in advance in a flow of the margin setting processing and then necessary margins are selected in the arrangement setting processing performed later. However, it is also possible not to set the various margins in advance but to set a necessary margin at need while performing the arrangement setting processing.

In addition, in the above embodiment, the UI compound processing is performed by the mobile terminal having a touch panel. However, the touch panel is not an essential element for the UI compound processing according to the present invention. The present invention may be applicable to any terminal, having an input unit with numerous mechanical keys or a direction indication unit for moving a pointer to select and determine a UI object, for example, with which a user may compound UIs.

Moreover, although the UI re-compound processing accompanying a change of the operation means is performed in the operation means detection mode in the above embodiment for convenience of description, the mobile phone 1 can be operated in such a mode all the time.

In addition, although the compound UI is generated with the UI objects composing a plurality of UIs in the above embodiment, the present invention is also applicable not only to a case of compounding based on the plurality of UIs but also to a case generating UI by selecting multiple UI objects from a single UI.

Moreover, although the UI definition file of the UI corresponding to each application is stored in the UI definition file memory area 52 in advance in the above embodiment, it is also possible to obtain a necessary UI definition file externally as necessary. In this case, if the UI definition file is specified from the application using the UI, it is determined whether the necessary UI definition file is stored in the UI definition file memory area 52 or the compound UI definition file memory area 56. If the necessary UI definition file is not stored in the UI definition file memory area 52 or the compound UI definition file memory area 56, the UI obtaining unit 12 of the control unit 10 obtains the necessary UI definition file from an external equipment or an external server (not shown) via the wireless communication unit 30.

Shown below is an exemplary file of the UIML form based on XML as an example of the UI definition file used in each of the above embodiment. In this example, the UI object is defined by <template> tag, and thus a description between <template> and </template> corresponds to the UI object definition information. Here, it shows an example of the UI object information of the UI objects "Power" and "Channel Selection+" from the UI definition file (TV1_interface.uiml) composing the TV remote UI. Among underlined parts, attribute of priority indicates priority order information (priority is higher as the value is closer to 0), attribute of relate indicates the relationship information with other UI objects, and attribute of size indicates the size information

```
<template id = "t1_switch 1" priority ="0">
    <part>
            <part class="G:Button" id="switch1"/>
        <style>
        <property name="image-src">TV_resorce_switch1.jpg</property>
        <property name="g:text">Power</property>
            <property name="g:size">30,30</property>
```

```
        </style>
        <behavior>
            <rule>
                <condition>
                <op name="and">
                    <event class="KeyListener.g:keypressed"/>
                    <op name="equal">
                        <property event-class="KeyListener.g:keypressed" name="keyCode" />
                        <constant value="57398" />
                    </op>
                </op>
                </condition>
                <action>
                    <call name="TVApp.on"/>
                </action>
            </rule>
        </behavior>
        </part>
</template>
<template id ="t1_select_up" priority ="1"relate id="select 1">
        <part>
                <part class="G:Button" id="select_up"/>
        <style>
        <property name="image-src">TV_resorce_select_up.jpg</property>
        <property name="g:text">Channel Selection +</property>
        <property name="g:size">30,20</property>
        </style>
        <behavior>
            <rule>
                <condition>
                <op name="and">
                    <event class="KeyListener.g:keypressed"/>
                    <op name="equal">
                        <property event-class="KeyListener.g:keypressed" name="keyCode" />
                        <constant value="57399" />
                    </op>
                </op>
                </condition>
                <action>
                    <call name="TVApp.select_up"/>
                </action>
            </rule>
        </behavior>
        </part>
</template>
```

INDUSTRIAL APPLICABILITY

According to the present invention, when a layout of UI objects (of a compound UI) are designed, an adequate space (margin) is provided around each UI object based on a type and a size of the UI object and a type of an adjacent UI object, as well as the terminal-dependent information (apparatus-dependent information) corresponding to specifications of the operation unit and the display unit of the mobile terminal. Accordingly, it is possible to design the layout without deteriorating operability when a compound UI is displayed.

REFERENCE SIGNS LIST 1 mobile phone
10 control unit
11 application program execution unit
12 user interface obtaining unit
13 user interface generation unit
14 operation means detection unit
15 UI processing unit
20 touch panel
22 input unit
24 display unit
30 wireless communication unit
40 infrared communication unit
50 memory unit
51 application program memory area
52 user interface definition file memory area
53 individual user interface resource memory area
54 common user interface resource memory area
55 relevant application program information memory area
56 compound user interface definition file memory area
57 terminal-dependent information memory area
60 user interface compound processing unit
61 user interface object definition information analysis unit
62 user interface object selection processing unit
63 compound user interface definition file generation unit
64 user interface resource shaping unit
70 automatic layout processing unit
71 arrangement setting unit
72 arrangement availability determination unit
73 reducing object selection unit
74 minimum size setting unit
75 margin setting unit
80 operation key unit
90 stylus storage unit

The invention claimed is:
1. A user interface generation apparatus comprising:
an application program execution unit configured to a variety of functions based on an application program;

a user interface generation unit configured to generate a user interface configured to instruct the application program execution unit to execute a predetermined function based on the application program;

a display unit configured to display the user interface generated by the user interface generation unit; and a memory unit configured to store user interface definition files, each of which includes user interface object definition information configured to define a user interface object which is a component of the user interface, and configured to store apparatus-dependent information which are information on unique characteristics of the user interface generation apparatus and depend on the user interface generation apparatus and the display unit, wherein the user interface generation unit generates a compound user interface in which user interface objects selected from a plurality of user interfaces of a plurality of application programs are compounded as one user interface, by selecting user interface object definition information stored in the memory unit, setting a margin for arranging a user interface object defined by the user interface object definition information selected, such that the margin is set on the basis of the user interface object definition information selected and the apparatus-dependent information, and arranging the user interface object defined by the user interface object definition information selected, on the basis of the margin in a predetermined display area on the display unit, wherein if the user interface object and another user interface object to be arranged adjacent to the user interface object are included in different user interface definition files, the user interface generation unit sets a larger margin between the user interface object and the another user interface object to be arranged adjacent thereto than a margin set between the user interface object and the another user interface object if both of the user interface objects are included in the same user interface definition file.

2. The user interface generation apparatus according to claim 1, wherein the apparatus-dependent information includes information on a standard size, which represents an area used as a standard when the user interface receives user operation, and the user interface generation unit, if both of the user interface object and another user interface object to be arranged adjacent to the user interface object are of a type to receive the user operation, sets a margin between the user interface object and the another user interface object to be arranged adjacent thereto, based on a display size of the user interface object and the standard size.

3. The user interface generation apparatus according to claim 1, wherein the apparatus-dependent information includes information on a standard size, which represents an area used as a standard when the user interface receives user operation, and the user interface generation unit, if the user interface object is of a type to receive the user operation, sets a margin between the user interface object and an edge of the display unit, for when the user interface object is arranged at the edge of the display unit, based on a display size of the user interface object and the standard size.

4. The user interface generation apparatus according to claim 1, wherein the apparatus-dependent information includes information determined based on a shape of a member defining a periphery of the display unit, and the user interface generation unit, if the user interface object is of the type to receive user operation, sets a margin for when the user interface object is arranged at an edge of the display unit, based on a display size of the user interface object and the apparatus-dependent information.

5. The user interface generation apparatus according to claim 1, wherein the user interface object definition information includes information on relationship between the user interface object and another user interface object, and the user interface generation unit, if the user interface object and another user interface object to be arranged adjacent to the user interface object are highly related to each other according to the information on relationship, sets a smaller margin between the user interface object and the another user interface object to be arranged adjacent thereto than a margin between the user interface object and other user interface object having no information on relationship.

6. The user interface generation apparatus according to claim 1, further comprising an input operation means determination unit for determining an input operation means to the user interface, wherein the apparatus-dependent information includes information on standard sizes corresponding to a plurality of input operation means for input to the user interface, and the user interface generation unit, if the user interface object is of the type to receive user operation, sets a margin between the user interface object and another user interface object to be arranged adjacent to the user interface object, based on a display size of the user interface object and the information on the standard size, in accordance with the input operation means determined by the input operation means determination unit.

7. The user interface generation apparatus according to claim 1, further comprising an input operation reception unit for receiving input to instruct the application program execution unit to execute a predetermined function based on the application program via the user interface, and an input operation means determination unit for determining an input operation means to the input operation reception unit, wherein the user interface generation unit changes the apparatus-dependent information in accordance with the input operation means determined by the input operation means determination unit.

8. The user interface generation apparatus according to claim 7, wherein the user interface generation unit, if a change of the input operation means is detected by the input operation means determination unit while the compound user interface is displayed on the display unit, changes the apparatus-dependent information in accordance with a current input operation means and generates a new compound user interface based on current apparatus-dependent information.

* * * * *